(12) United States Patent
Haeberle

(10) Patent No.: US 12,735,906 B2
(45) Date of Patent: Sep. 15, 2026

(54) TURNBUCKLE FOR TENSIONING FRAME FORMWORK ELEMENTS

(71) Applicant: PERI SE, Weissenhorn (DE)

(72) Inventor: Wilfried Haeberle, Langenau (DE)

(73) Assignee: PERI SE, Weissenhorn (DE)

( * ) Notice: Subject to any disclaimer, the term of this patent is extended or adjusted under 35 U.S.C. 154(b) by 500 days.

(21) Appl. No.: 18/257,706

(22) PCT Filed: Dec. 10, 2021

(86) PCT No.: PCT/EP2021/085235

§ 371 (c)(1),
(2) Date: Jan. 8, 2024

(87) PCT Pub. No.: WO2022/128799

PCT Pub. Date: Jun. 23, 2022

(65) Prior Publication Data

US 2024/0133190 A1 Apr. 25, 2024

(30) Foreign Application Priority Data

Dec. 15, 2020 (DE) ..................... 10 2020 133 600.4

(51) Int. Cl.

*F16B 2/12* (2006.01)
*E04G 17/02* (2006.01)
*E04G 17/04* (2006.01)
*F16B 5/06* (2006.01)

(52) U.S. Cl.

CPC ............. *E04G 17/04* (2013.01); *E04G 17/02* (2013.01); *F16B 2/12* (2013.01); *F16B 5/0607* (2013.01)

(58) Field of Classification Search

CPC ............ F16B 2/12; E04G 17/02; E04G 17/04
See application file for complete search history.

(56) References Cited

FOREIGN PATENT DOCUMENTS

| | | | | |
|---|---|---|---|---|
| DE | 8535906 U1 | 3/1991 | | |
| DE | 3941937 A1 | 6/1991 | | |
| DE | 10028556 C1 | 9/2001 | | |
| DE | 10 2006 016 879 A1 * | 10/2007 | ............. | E04G 17/04 |
| GB | 2275315 A | 8/1994 | | |
| WO | 2005007997 A1 | 1/2005 | | |
| WO | 2016027339 A1 | 2/2016 | | |
| WO | WO-2020/159455 A1 * | 8/2020 | ............. | E04G 17/04 |

* cited by examiner

*Primary Examiner* — Michael P Ferguson
(74) *Attorney, Agent, or Firm* — SLEMAN & LUND LLP

(57) ABSTRACT

A turnbuckle for tensioning frame formwork elements, the turnbuckle comprising a first clamping apparatus which has a crosspiece and a first clamping jaw. The crosspiece has a guide portion comprising a row of track teeth which are arranged behind one another and extend in parallel with one another. The turnbuckle also has a second clamping apparatus which has a second clamping jaw. The second clamping apparatus can be shifted in a tensioning direction along the longitudinal axis of the crosspiece towards the first clamping jaw. The track teeth extend in each case in an arc from a first longitudinal edge of the crosspiece towards a second longitudinal edge of the crosspiece. The second clamping apparatus has at least one support tooth which extends in an arc and can be rotated about a rotational shaft.

23 Claims, 13 Drawing Sheets

14
12
13
7
20
24
15
11
17
11
6
9
8
1
10

1
6
7
8
9
10
11
11
12
13
14
15
17
20
24

VIII
14

18
20
24
18a
15
7
VIII

TURNBUCKLE FOR TENSIONING FRAME FORMWORK ELEMENTS

REFERENCE TO RELATED APPLICATIONS

The present application claims the priority of the German patent application no. 10 2020 133 600.4, the content of which is incorporated herein by reference in its entirety.

FIELD

The invention relates to a turnbuckle for tensioning frame formwork elements.

BACKGROUND

A generic frame turnbuckle is known from WO 2005/007997 A1.

Frame formwork elements are used to erect boundaries for bodies to be cast, in particular concrete bodies such as building parts. In order to obtain castable boundaries, a plurality of frame formwork elements must generally be fixedly connected or tensioned with one another. Turnbuckles, also known as alignment couplers, are used to tension the frame formwork elements.

In general, turnbuckles are used to connect adjoining frame formwork elements to one another in a flush, aligned and tight manner. Turnbuckles are used in particular to connect or tension two adjoining frame formwork elements with one another, and in particular inner corners, outer corners, articulated corners and face formwork can also be connected with the aid of the turnbuckles.

The turnbuckles can also be used to connect a frame formwork element to an adjoining compensating element. Compensating elements are used to provide length compensation and are typically arranged between two conventional frame formwork elements. The compensating elements are usually made of wood, steel or aluminum.

Conventional frame formwork elements generally have a formwork skin, a preferably circumferential frame with at least vertically extending frame elements and horizontally extending struts for stabilizing the frame. The struts generally extend horizontally between two vertical frame elements of the frame. In addition, vertical struts can also be provided to further stabilize the frame. Compensating elements can have a different structure, but a circumferential frame is generally also provided in this case.

Compensating elements also constitute frame formwork elements in the context of the present invention.

Turnbuckles are generally arranged in the region of the intersections of horizontally extending struts and vertically extending frame elements of the frame. In each case, one clamping jaw of the turnbuckle engages around a portion of a vertically extending frame element of two frame formwork elements to be connected. By means of a wedge, the two clamping jaws and thus the frame formwork elements are then tensioned against one another, i.e. the clamping jaws are moved towards one another.

The turnbuckle generally has a crosspiece and a first clamping jaw, which is typically connected immovably to the crosspiece. Furthermore, the turnbuckle has a second clamping jaw, wherein the second clamping jaw can be shifted in a tensioning direction along the longitudinal axis of the crosspiece towards the first clamping jaw in order to tension the frame formwork elements.

The clamping jaws preferably each have two claws, wherein the two claws of a clamping jaw have a distance from one another such that a horizontally extending strut can be accommodated between the two claws.

Such clamping jaws are also referred to as lugs.

In the case of the turnbuckles known from the prior art, it is usually provided that the direction of translation of the wedge when it is driven into the turnbuckle during tensioning and the tensioning direction are at a right angle to one another. If two horizontally adjacent frame formwork elements are connected in a conventional manner to such a turnbuckle, i.e. tensioned horizontally, gravity acts fully on the wedge in such a way that it is pulled in the direction of greater tensioning.

In order to tension boundary surfaces of two adjacent frame formwork elements which experience particularly large forces, for example in articulated corners or outer corners, several turnbuckles are used adjacent to one another. The turnbuckles are then typically arranged on a straight line, e.g. one below the other, i.e. vertically offset from one another, with parallel tensioning movements of the clamping jaws in each case.

However, this arrangement can cause the problem of the wedges of the individual turnbuckles interfering with each other. Furthermore, care must be taken to maintain a sufficient distance between the wedge ends, which are driven in and released by means of hammers, and any kind of obstruction so that operation by means of a hammer is possible without interference.

An important requirement for turnbuckles is that they should be suitable for connecting frame formwork elements whose frames have different thicknesses, for example depending on whether outer corners, articulated corners or the like are to be connected. For this purpose, it is advantageous if the turnbuckle has a quick adjustment feature so that the distance between the two clamping jaws of the turnbuckle can be quickly and easily set to the desired dimension, the turnbuckle attached and then the frame formwork elements tensioned. The turnbuckles should thus have a suitable span that can be adjusted quickly. At the same time, however, it is also required that large forces can be applied briefly, so that the turnbuckle, when attached to two frame formwork elements, can reliably fix or tension them. The aforementioned turnbuckles, which are tensioned with a combination of hammer and wedge, have proven to be suitable for this purpose.

However, the use of hammers to drive in and release the wedges leads to noise pollution on the construction site, which is to be avoided as far as possible.

A further disadvantage of the aforementioned turnbuckles is that they generally cannot be mounted on the lowest strut since there is not enough space there. The wedge requires space below the crosspiece into which the wedge is to be driven, so that the wedge can project below the crosspiece. Furthermore, there must be sufficient space to be able to release the wedge again by hammer blows in the opposite direction.

Turnbuckles that can be operated without striking aids are also known from the prior art. In this case, length adjustment by means of a spindle is known, but this does not allow quick adjustment.

The turnbuckles known from the prior art are predominantly complicated to handle or have bulky, large-volume structures.

In practice, turnbuckles have become established in which the two clamping jaws, as described above, can be moved towards one another and tensioned together by means of a wedge driven in by a striking tool. Such turnbuckles have become established since these turnbuckles on the one hand ensure a flush, aligned and tight connection between frame formwork elements, and on the other hand such turnbuckles enable quick adjustment in order to adjust the turnbuckles to different spans between the frames of the frame formwork elements to be connected.

Such a turnbuckle is disclosed in the generic document. In the generic document, it is stated that the direction with which the wedge is driven into the turnbuckle and the tensioning direction enclose an angle $\alpha<90°$ to improve operation of the wedge. Typically, however, the angle in such turnbuckles is $\alpha=90°$.

SUMMARY

The object of the present invention is to improve the known prior art, in particular to provide a turnbuckle for tensioning frame formwork elements, in which the two clamping jaws can be moved towards one another easily and quickly and can be tensioned against one another so that a tight connection can be produced between two frame formwork elements to be tensioned.

This object is solved by a turnbuckle for tensioning frame formwork elements.

The turnbuckle according to the invention for tensioning frame formwork elements has a first clamping apparatus which has a crosspiece and a first clamping jaw. The crosspiece has a guide portion comprising a row of track teeth which are arranged behind one another and extend in parallel to one another. The turnbuckle according to the invention also has a second clamping apparatus which has a second clamping jaw. The second clamping apparatus can be shifted in a tensioning direction along the longitudinal axis of the crosspiece towards the first clamping jaw. According to the invention, it is provided that the track teeth extend in each case in an arc from a first longitudinal edge of the crosspiece towards a second longitudinal edge of the crosspiece. According to the invention, the second clamping apparatus has at least one support tooth which extends in an arc and can be rotated about a rotational shaft, wherein the rotational shaft extends orthogonally to an upper side of the crosspiece, wherein by means of a screwing-in movement, the support tooth can be screwed into a track between two track teeth and can be brought into engagement with one of the track teeth, and wherein an incline of the arc extension of the support tooth and an incline of the arc extension of the track teeth are matched to one another such that, after the support tooth is brought into engagement with a track tooth, a further screwing-in movement of the support tooth applies a force to the second clamping apparatus, which force is suitable for pressing the second clamping apparatus in the tensioning direction.

The turnbuckle according to the invention has a structure which is easy to operate and robust with two clamping apparatuses, wherein the first clamping apparatus is designed in a known manner with a crosspiece and a first clamping jaw, and the second clamping apparatus, which has a second clamping jaw, can be shifted along the longitudinal axis of the crosspiece towards the first clamping jaw. This structure has generally proven itself in practice, especially since this type of movement makes it possible to perform a quick adjustment in a simple manner. This means that the span or the distance between the two clamping jaws of the turnbuckle can be adjusted quickly and easily to the distance required for tensioning two frame formwork elements. Such a structure is known in principle from the prior art.

An advantage over the prior art is now that the use of a hammer and a wedge is no longer necessary for tensioning the turnbuckle, since the track teeth now extend in an arc in accordance with the invention and the support tooth, which also extends in an arc, can be screwed into a track between two track teeth and brought into engagement with one of the track teeth by a rotary movement about a rotational shaft.

A suitable choice of the incline of the arc extension of the support tooth and the incline of the arc extension of the track teeth ensures that a further screwing-in movement of the support tooth leads to the support tooth and the respective track tooth being pressed against one another, which leads to a force being applied to the second clamping apparatus, which force presses the latter in the tensioning direction, as a result of which the second clamping jaw is also pressed towards the first clamping jaw and the turnbuckle thus tensions the frame formwork elements.

The track teeth and the support tooth are preferably arranged in such a way or coordinated with one another with respect to the incline of their arc extensions in such a way that the force applied to the clamping apparatus preferably rises steadily, the further the support tooth is screwed in.

The arc extension of the support tooth preferably corresponds to a screw geometry such that screwing in the support tooth causes a pulling movement on the track teeth of the crosspiece. Preferably, the design of the support teeth and the track teeth relative to one another is provided in such a way that the lever ratio is improved as the screwing-in movement increases and thus the force which presses the second clamping apparatus in the tensioning direction increases.

The turnbuckle according to the invention can be produced by virtue of the principle of a worm gear being applied or implemented two-dimensionally by the screw-in support tooth and the track teeth, which are formed on the guide portion of the crosspiece. The geometry of a worm gear is thus transferred to the crosspiece.

It has been shown that a toothing formed thereby, which can also be referred to as a rotary toothing, is particularly suitable for achieving the result that the second clamping apparatus is pressed in the tensioning direction.

The screwing-in movement of the support tooth can be achieved in a simple manner without requiring the use of a hammer, thereby reducing noise at the construction site. Furthermore, a screwing-in movement and also an unscrewing movement can be achieved without requiring any additional space above or below the turnbuckle, as is the case with the hammer/wedge solution from the prior art. This means that the turnbuckle according to the invention can also be mounted on the lowermost strut of a frame formwork element, since no additional space is required below the strut to operate the turnbuckle.

It has been shown that the support tooth and the track teeth can be designed in a simple manner, in particular by selecting a suitable incline, in such a way that the turnbuckle is prevented from opening independently by self-locking. Preferably, the track teeth have an incline of >5 degrees, in particular 7 degrees and greater. The incline can preferably be 5 degrees to 15 degrees, more preferably 5 degrees to 12 degrees, in particular 7 degrees to 10 degrees. These values have proven to be particularly suitable.

The incline of the track teeth preferably increases. The incline preferably increases between 5 degrees and 12 degrees, in particular between 7 degrees and 10 degrees.

By selecting a suitable incline, the force with which the second clamping apparatus is pressed into the tensioning direction can be adjusted.

In a simple manner, a continuous adjustment can be achieved with the turnbuckle according to the invention, in particular by selecting the offset or the distance between the track teeth or their incline such that there is always a suitable track into which the support tooth can be screwed or by selecting the distance from an adjacent track such that, when the tensioning force required to press the clamping apparatus in the tensioning direction is not sufficient to tension the frame formwork elements, the support tooth is screwed into an adjacent track (in the tensioning direction), as a result of which the second clamping apparatus is shifted further in the tensioning direction, that is to say in the direction of the first clamping jaw, at the beginning of the screwing-in movement, so that further screwing-in of the support tooth causes a correspondingly higher force with which the second clamping apparatus is pressed in the tensioning direction.

More than one support tooth can also be provided. It is possible for a plurality of support teeth to enter the same track one after the other. Furthermore, a plurality of support teeth can also be provided which enter different, preferably adjacent, tracks.

It is advantageous if the arc extension of the support tooth and/or the arc extension of the track teeth is, at least in sections, preferably completely, an involute.

It has been found to be particularly suitable for the arc extension of the support tooth and the arc extension of the track teeth to be an involute at least in sections, preferably completely.

It is advantageous if the arc extension of all track teeth is identical.

It is further advantageous if the arc extension of the support tooth and/or the arc extension of the track teeth at each point has a curvature at each point such that an involute is obtained.

It has been shown that such a design, in particular when both the arc extension of the support tooth and the arc extension of the track teeth are designed in such a way, results in an incline which is particularly suitable for achieving the result that a screwing-in movement of the support tooth causes a force to be applied to the second clamping apparatus, which force is suitable for pressing the second clamping apparatus in the tensioning direction, and the force thereby increases the further the support tooth is screwed in.

It is advantageous if the arc extension of the support tooth is an involute with respect to the rotational shaft about which the support tooth rotates.

The support tooth preferably has an arc extension which extends over an angle range of 10 to 180 degrees, preferably over 20 to 130 degrees, in particular over 30 to 110 degrees, more preferably above 40 to 100 degrees, in particular above 50 to 90 degrees.

According to the invention, it can further be provided that the second clamping apparatus has a rotary disk, wherein the support tooth is formed on a main surface of the rotary disk and the rotational shaft about which the support tooth is rotatable is the rotational shaft of the rotary disk.

An arrangement of the support tooth on a main surface of a preferably flat rotary disk has proven to be particularly suitable for screwing the support tooth into a track between two track teeth. The rotary disk can preferably be circular. Preferably, the support tooth is formed on a main surface of the rotary disk which is an underside of the rotary disk, that is to say, faces the crosspiece.

The rotary disk preferably has a diameter that is greater than the width of the crosspiece or an upper side of the crosspiece.

The support tooth extends on the main surface of the rotary disk preferably over an angle range of 10 to 180 degrees, preferably of 20 to 130 degrees, in particular of 30 to 110 degrees, more preferably of 40 to 100 degrees, in particular of 50 to 90 degrees.

It is advantageous if a stop, preferably a stop pin, is provided which limits the screwing-in movement of the support tooth.

By means of a stop, preferably a stop pin, it is possible to transmit to the user, haptically and/or optically, information about the current position of the support tooth or how far the support tooth is screwed in, in particular whether it is completely screwed into a track between two track teeth or completely unscrewed. If the operator determines that the support tooth is completely screwed in, and nevertheless the clamping force produced is not sufficient, the user can remove the support tooth from the track again by means of an unscrewing movement and screw the support tooth into a further track running ahead in the tensioning direction in order to increase the clamping force.

Preferably, the stop is preferably rigidly connected to the rotary disk.

It is advantageous if the rotary disk is rotatably accommodated in a housing part of the second clamping apparatus, wherein the housing part is connected immovably to the second clamping jaw and wherein the housing part has a circular arc-shaped recess within which the stop is movable.

It has been shown that the arrangement of the rotary disk in a housing part, which at least partially surrounds the rotary disk, is advantageous, wherein the housing part preferably encloses the rotary disk at least on an upper side. Preferably, in this case the rotary disk can have recesses to form the circular recess and/or a passage for the rotational shaft.

The housing part can advantageously accommodate the rotary disk, ensure rotatability and protect the rotary disk from damage.

The housing part is preferably immovably or rigidly or fixedly connected to the second clamping jaw. It is advantageous if the housing part has a circular arc-shaped recess within which the stop, preferably a stop pin, is movable. Preferably, the stop or the stop pin projects into the circular arc-shaped recess. The respective end faces of the circular-arc-shaped recess can serve as end stops, so that the operator sees whether the support tooth is completely screwed in or completely unscrewed or in which intermediate position it is currently located.

It is advantageous if the circular arc-shaped recess in the housing part is designed such that the position of the stop within the circular arc-shaped recess is visible to the operator when operating the rotary disk.

Preferably, the circular arc-shaped recess is formed in a surface of the housing part, which surface at least partially covers an upwardly directed main surface of the rotary disk, that is to say the upper side of the rotary disk. As a result, the stop projecting into the circular arc-shaped recess is clearly visible to the operator of the rotary disk.

It is advantageous if the rotational shaft of the rotary disk has an input member, preferably a sleeve or a tube stub, on which a tool can be placed in order to rotate the rotary disk.

The input member of the rotary disk, preferably a sleeve or a tube stub, preferably projects through a corresponding opening in the housing part, so that the rotary disk can be easily operated by the operator. In this case, the input member can have a design that is easy to operate with conventional tools, preferably as noiselessly as possible, preferably also in such a way that appropriate forces can be applied quickly and easily to bring the support tooth into engagement with one of the track teeth and to exert the desired force in the tensioning direction on the second clamping apparatus.

It is advantageous if the input member of the rotational shaft has a profile which can be operated by means of a polygonal drive, preferably a hexagon drive, or a hammer tip or an anchor rod, in particular a Dywidag bar.

It has been found to be particularly suitable for the input member to have a profile or a driving profile which can be operated by means of a polygonal drive, preferably a hexagon drive or a square drive, in particular a ratchet or a wrench. It has also been found to be suitable for the input member to be designed such that, for example through a design as a tube stub with a bore, it is possible to operate the input member with a hammer tip or an anchor rod, in particular a Dywidag bar that is frequently used on the construction site. This allows easy handling of the turnbuckle according to the invention on the construction site.

It is advantageous if the track teeth are arranged in a uniform grid dimension.

It is advantageous if the offset (and thus the incline) by which two adjacent track teeth are offset from one another is 5 mm to 40 mm, preferably 6 mm to 35 mm, more preferably 6 mm to 30 mm, even more preferably 8 mm to 25 mm, very particularly preferably 10 mm to 20 mm, in particular 16 mm to 17 mm.

The aforementioned values have been found to be particularly suitable, and preferably the track teeth each have a uniform grid dimension using the aforementioned values for the offset between two adjacent track teeth.

The offset between two track teeth is understood to mean the offset by which two adjacent track teeth are offset relative to one another in the longitudinal direction of the crosspiece, as illustrated in FIG. 19 by the reference sign Z.

According to the invention, it can further be provided that the second clamping apparatus is captively connected to the crosspiece of the first clamping apparatus.

It has proven to be particularly suitable for handling on the construction site if the second clamping apparatus is captively connected to the first clamping apparatus. A captive design in the tensioning direction of the second clamping apparatus is obtained in a simple manner by the first clamping jaw being in the path of the second clamping jaw, so that loss protection is formed in the tensioning direction. In a direction opposite to the tensioning direction, a captive fastening mechanism can preferably be provided by the crosspiece having a protrusion, for example by a projection being formed or otherwise incorporated in the end of the crosspiece facing away from the first clamping jaw. It is also possible for the second clamping apparatus or the crosspiece to have a pin or generally a stop element, so that the second clamping apparatus is prevented in a form-fitting manner from being pulled off the crosspiece counter to the tensioning direction.

It is advantageous if the arc extension of the support tooth is selected such that the support tooth can be rotated into a release position in which the support tooth does not impede a movement of the second clamping apparatus in or against the tensioning direction.

It has been found to be particularly advantageous to select the arc extension of the support tooth such that the support tooth can be rotated into a release position in which the support tooth does not impede a movement of the second clamping apparatus in or against the tensioning direction. That is, in the release position, the support tooth is disengaged from the track teeth so that the clamping device can be moved in or against the tensioning direction along the longitudinal axis of the crosspiece or along the guide portion without the movement being limited by the support tooth or one of the track teeth. Such a design can be achieved in a simple manner by a suitable arc extension of the support tooth, in particular also by the fact that the unscrewing movement of the support tooth from a track between two track teeth can go far enough so that a movement of the second clamping apparatus in or against the tensioning direction, unhindered by the support tooth, is possible.

It is advantageous if the second clamping apparatus can be shifted along the guide portion of the first clamping apparatus when the support tooth is not in engagement with one of the track teeth.

According to the invention, it can further be provided that the arc extension of the track teeth is selected such that the track teeth allow continuous adjustment.

It is advantageous if the position of the second longitudinal edge of the end of a track tooth facing the crosspiece and the position of the beginning of a track tooth next in the tensioning direction and facing the first longitudinal edge of the crosspiece are matched to one another in such a way that continuous adjustment is achieved.

If, when the support tooth is screwed in, it is found that the force resulting between the support tooth and the track tooth with which the support tooth is in engagement is not sufficient to tension the turnbuckle in the desired manner, even though the support tooth has been screwed into the end position, then the support tooth can be unscrewed again and brought into engagement with an adjacent track tooth. In this case, it is advantageous if the beginning of the adjacent track tooth is positioned in such a way that right at the beginning, and thus continuously once the support tooth has been screwed in, a force is produced which corresponds to the force which was present between the support tooth and the track tooth at the end of the screwing-in movement into the aforementioned track tooth.

The track teeth and their extensions are preferably designed such that the beginning of a track tooth adjoins the end of an adjacent track tooth trailing in the tensioning direction. The track teeth preferably interact as if they were a single common track tooth or a revolving worm toothing.

Thus, the end of a track tooth corresponds to the beginning of a track tooth running ahead in the tensioning direction.

In a particularly advantageous development of the invention, it can be provided that the second clamping apparatus has an underside which can be screwed in together with the support tooth, wherein the catch tooth runs ahead of the support tooth in the screwing-in direction, so that the catch tooth first enters one of the tracks between two track teeth.

The formation of a catch tooth has proven to be particularly suitable for screwing the support tooth in a reliable and collision-free manner into the intended track. This is particularly suitable because no significant load is applied to the catch tooth and it can therefore be entered into the track between two track teeth without any damage being expected. Even if the catch tooth strikes the tip of a track tooth, no damage is to be feared since the catch tooth is not subjected to any significant load. However, the catch tooth ensures that the following support tooth does not strike a tip of a track tooth when engaging or entering a track, thereby reliably avoiding damage that could otherwise occur because the support tooth transmits large forces.

If the catch tooth does strike the tip of a track tooth, the user has the option, without causing damage, of shifting the second clamping apparatus slightly in or against the tensioning direction so that the catch tooth enters a track between two track teeth.

The catch tooth makes it possible for the following support tooth to already be aligned on a track between two track teeth before the support tooth enters the track.

The catch tooth thus serves as a single-track tooth or as a centering lug.

The catch tooth and the support tooth are preferably formed on the same main surface, preferably an underside of the rotary disk.

It is advantageous if the offset between two adjacent track teeth and the offset between the catch tooth and the support tooth is designed such that, when the catch tooth enters a track between two track teeth, the support tooth enters a further track between two track teeth, which track is offset in the tensioning direction, without colliding with an end face of one of the track teeth.

Such a selection of the offset or the distance—viewed in the tensioning direction—between two adjacent track teeth, or between the catch tooth and the support tooth, reliably ensures collision-free entry of the support tooth.

Preferably, the distances are such that the catch tooth and the support tooth enter adjacent tracks or a track between the catch tooth and the support tooth remains free.

It is advantageous if the catch tooth has a length that is less than 50%, preferably less than 40%, more preferably less than 30%, even more preferably less than 20%, in particular less than 10%, of the length of the arc extension of the support tooth.

In principle, the catch tooth and the support tooth can be designed identically. However, it has been found to be particularly suitable for the catch tooth to have a significantly smaller length than the support tooth. Since the only task of the catch tooth is to ensure that the support tooth is entered into the track in a collision-free manner, a significantly smaller length is sufficient here, which also ensures that the catch tooth is easy to manufacture and does not otherwise interfere with the screwing-in and unscrewing movement of the support tooth or, where possible, does not come into engagement with a track tooth even after entering the track.

It is advantageous if the second clamping apparatus has a secondary support tooth which extends in an arc and which can be screwed into one of the tracks between two track teeth by means of the screwing-in movement and can be brought into engagement with one of the track teeth, preferably a track tooth which is adjacent to the track tooth on which the support tooth engages, wherein the support tooth is preferably arranged running ahead of the secondary support tooth in the screwing-in direction.

It has been shown that it is generally sufficient for the clamping apparatus to have one support tooth in order to exert a suitable force on the clamping apparatus in the tensioning direction. However, it can be advantageous, in particular for specific embodiments, if the second clamping apparatus has, in addition to the support tooth, a secondary support tooth which extends in an arc.

In this case, it is advantageous if the support tooth and the secondary support tooth form a double involute.

The arc extension of the secondary support tooth can preferably correspond to the arc extension of the support tooth, but it is also possible for the secondary support tooth to have a length which is longer or shorter than the length of the support tooth. Preferably, the support tooth and the secondary support tooth overlap in an angle range which is preferably 1° to 30°, in particular 2° to 20°, particularly preferably 5° to 20°.

It is advantageous if the rotary disk is arranged in the width direction of the crosspiece such that the rotational shaft of the rotary disk is located centrally between the longitudinal edges of the crosspiece and extends orthogonally to a surface of the crosspiece.

Such an arrangement of the rotary disk with respect to the crosspiece has proven to be particularly suitable, in particular for operating the turntable advantageously and for entering the support tooth and, optionally, the catch tooth and/or the secondary support tooth into tracks between two track teeth in the desired manner.

The fact that the rotational shaft extends orthogonally to a surface of the crosspiece results in particularly suitable operation of the rotational shaft when the turnbuckle is fastened in the usual manner to two frame formwork elements. In this case, the rotational shaft then runs in the horizontal direction, in particular orthogonally to the surface of the frame formwork elements, so that operation is possible in a simple manner for the operator.

In an alternative configuration of the invention, it can be provided that the rotary disk is designed as an eccentric disk or the rotary disk has an eccentrically arranged rotational shaft.

Forming the rotary disk as an eccentric disk or forming the rotary disk such that it has an eccentrically arranged rotational shaft, i.e. the rotary disk is arranged off center, leads in a simple manner to the support tooth performing an eccentric movement, as a result of which, as soon as the support tooth is brought into engagement with one of the track teeth, a corresponding force is produced between the track tooth and the support tooth, which force presses the clamping apparatus in the tensioning direction.

It is advantageous if a span of a distance between the first clamping jaw and the second clamping jaw is 0 mm to 400 mm, preferably 0 mm to 350 mm, more preferably 0 mm to 300 mm, in particular 0 mm to 250 mm.

It can also be provided that the lower value of the distance in the aforementioned examples is not 0 mm, but 80 mm, preferably 100 mm. This is because it is not generally necessary to push the clamping jaws together in such a way that they touch each other.

The aforementioned values for the span between the first clamping jaw and the second clamping jaw mean that the turnbuckle can be constructed inexpensively and robustly. The turnbuckle can also be quickly and easily adjusted to the desired dimension. It has been shown that the aforementioned spans are sufficient to connect common frame formwork elements to one another.

When tensioning two frame formwork elements, the turnbuckles used span a typically straight boundary line between the frame formwork elements. In this case, the turnbuckles are preferably arranged one below the other or one above the other on a straight line extending parallel to this boundary line, wherein the tensioning movements of the clamping jaws of the turnbuckles extend parallel to one another in each case.

The first clamping apparatus and the second clamping apparatus, in particular the clamping jaws and the crosspiece, are preferably forged parts. Preferably, the clamping jaws and the crosspiece are made of steel. The crosspiece is preferably a rolled tube. The track teeth in the crosspiece are preferably produced by profiling the tube.

The catch tooth preferably has a maximum thickness of 3.5 mm to 5 mm, preferably 3.8 mm to 4.8 mm, in particular 4.3 mm, optionally +/−0.2 mm. The distance between the beginning and the end of the catch tooth, i.e. the two tips, is preferably 6 mm to 15 mm, more preferably 8 mm to 12 mm, in particular 9.6 mm, optionally +/−0.4 mm.

The support tooth preferably has a maximum thickness of 4 mm to 7 mm, preferably 4 mm to 6 mm, in particular 5 mm, optionally +/−0.2 mm. The distance between the beginning and the end of the support tooth, i.e. the two tips, is preferably 50 mm to 80 mm, more preferably 60 mm to 75 mm, in particular 68.9 mm, optionally +/−2 mm.

The majority of the track teeth, particularly preferably all track teeth, have a thickness which varies along the length of the track teeth. The majority of the track teeth, preferably all track teeth, have a maximum thickness in the range from 3.5 mm to 7 mm, preferably 4 mm to 6 mm, in particular 4.6 to 5 mm. The distance between the beginning and the end of one of the track teeth, i.e. its two tips, is preferably 15 mm to 40 mm, more preferably 20 mm to 30 mm, in particular 24 mm, optionally +/−2 mm.

Because the rotational shaft extends orthogonally to the upper side of the crosspiece, the turnbuckle can be operated in a particularly advantageous manner. Furthermore, the turnbuckle can be produced in a particularly simple manner with a rotational shaft arranged in such a way; in particular, the track teeth can be formed particularly advantageously on the upper side of the crosspiece.

The upper side of the crosspiece is also referred to in the application as the surface of the crosspiece.

The first longitudinal edge of the crosspiece and the second longitudinal edge of the crosspiece delimit the crosspiece in the width direction (transverse to the longitudinal axis).

The upper side of the crosspiece is formed between the first longitudinal edge of the crosspiece and the second longitudinal edge of the crosspiece.

The upper side of the crosspiece is the surface or side of the crosspiece facing away from an underside of the crosspiece, which is used for bearing against the frame formwork elements to be tensioned.

The crosspiece is preferably a tube, in particular a rolled tube, wherein the track teeth are formed on the upper side, preferably by profiling the tube. The underside of the crosspiece facing away from the upper side is preferably used for bearing against the frame formwork elements to be tensioned. The crosspiece preferably further has two side surfaces which extend orthogonally to the upper side and which preferably extend plane-parallel to one another in order to connect the upper side of the crosspiece to the underside of the crosspiece. Preferably, the upper side, the underside and the two side surfaces form a rectangle when viewed in the cross-section of the crosspiece.

The support tooth is formed on a main surface of the rotary disk which constitutes an underside of the rotary disk, i.e. faces the crosspiece. The underside of the rotary disk or the main surface extends plane-parallel to the upper side of the crosspiece.

The screwing-in movement of the support tooth extends in a plane which preferably runs at least approximately plane-parallel to the upper side or the surface of the crosspiece.

The clamping surfaces of the first clamping jaw and the second clamping jaw project beyond the underside of the crosspiece. In this case, it can be provided that the first clamping jaw and/or the second clamping jaw have, preferably in each case at their ends, claws, preferably two claws, preferably such that two frame formwork elements to be tensioned together are tensioned between the underside of the crosspiece and the clamping jaws, preferably between the clamping surfaces thereof and in particular the claws.

In addition, it should be pointed out that terms such as "comprising," "having," or "with" do not exclude any other features or steps. Furthermore, terms such as "one" or "the" which refer to a single number of steps or features do not exclude a plurality of features or steps—and vice versa.

The figures each show preferred embodiments in which individual features of the present invention are shown in combination with one another. Features of an embodiment can also be implemented separately from the other features of the same embodiment and can accordingly be easily combined with features of other embodiments by a person skilled in the art to form further useful combinations and subcombinations.

In the figures, functionally identical elements are provided with the same reference signs.

DETAILED DESCRIPTION

Figure 1:
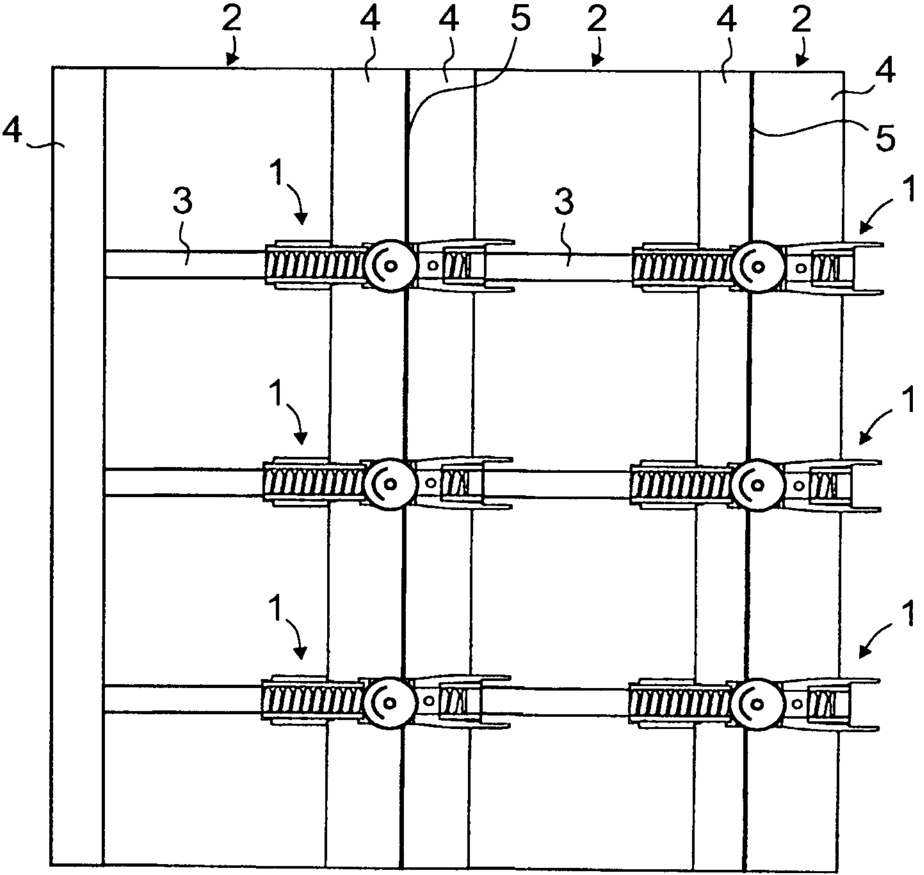
FIG. 1 an arrangement of three frame formwork elements, wherein the middle frame formwork element is tensioned to the outer frame formwork elements in each case by means of three turnbuckles according to the invention.

FIG. 1 shows six turnbuckles 1 according to the invention which connect frame formwork elements 2 to one another. A frame formwork element 2 that is central in the image plane forms a right-angled outer corner with a frame formwork element 2 on the right in the image plane. Three turnbuckles 1 are provided as an example for tensioning the two frame formwork elements 2. The frame formwork element 2, which is central in the image plane, is also connected, likewise by means of three turnbuckles 1 according to the invention, to a frame formwork element 2 on the left in the image plane, said frame formwork elements extending together in one plane.

The turnbuckles 1 according to the invention are generally suitable for connecting or tensioning together two adjacent frame formwork elements 2, wherein in particular inner corners, outer corners, articulated corners and face formwork can be connected with the aid of the turnbuckles 1 according to the invention.

The turnbuckles 1 according to the invention are also suitable for connecting a frame formwork element 2 to an adjoining compensating element. In the context of the present invention, such compensating elements likewise constitute frame formwork elements.

The frame formwork elements 2 to be connected can preferably be made of wood, plastic, steel or aluminum. In general, the turnbuckles 1 according to the invention can be used to connect adjoining frame formwork elements 2 to one another in a flush, aligned and tight manner.

In particular, the turnbuckles 1 according to the invention are used to connect two frame formwork elements 2 positioned next to one another and extending in a common plane, as illustrated in FIG. 1.

The turnbuckles 1 according to the invention are generally arranged in the region of intersections of horizontally extending struts 3 and vertically extending frame elements 4 of the frame formwork elements 2, as is illustrated by way of example with respect to the frame formwork element 2 central in the image plane and the left frame formwork element 2 in FIG. 1.

In a manner not described in greater detail, the frame formwork elements 2 have a formwork skin which faces the material to be filled in and cured.

The frame formwork elements 2 are preferably frame formwork elements for producing bodies to be cast, in particular concrete bodies, in particular building parts.

Such frame formwork elements 2 are well known from the prior art, which is why they will not be discussed in more detail below.

The frame formwork elements 2 abut one another in a known manner with a boundary surface. The boundary surface is illustrated in FIG. 1 as a boundary line 5 between the middle frame formwork element 2 and the right frame formwork element 2, or the middle frame formwork element 2 and the left frame formwork element 2.

The boundary line 5 is spanned by three turnbuckles 1 in each case.

The turnbuckles 1 each also span a vertically extending frame element of the frame formwork elements 2 to be connected to one another. Furthermore, the turnbuckles 1 are preferably arranged on the horizontally extending struts 3 of the frame formwork elements 2, in particular in such a way as is illustrated in the three turnbuckles 1 which connect the middle frame formwork element 2 to the left frame formwork element 2.

A particularly advantageous design for enabling the turnbuckles 1 to be arranged on the horizontally extending struts 3 is illustrated in particular in FIGS. 2 to 4 and 9 to 17.

FIGS. 2 to 19 show the turnbuckle 1 according to the invention for tensioning frame formwork elements 2 in various embodiments.

The turnbuckles 1 illustrated in FIGS. 2 to 19 have a first clamping apparatus 6 and a second clamping apparatus 7, which together form the turnbuckle 1 in the exemplary embodiment.

The first clamping apparatus 6 has a crosspiece 8, which is preferably formed integrally with a first clamping jaw 9.

The first clamping jaw 9 is rigidly or fixedly connected to the crosspiece 8.

The crosspiece 8 has a guide portion 10 comprising a row of track teeth 11 which are arranged behind one another and extend in parallel with one another.

In the exemplary embodiment, the guide portion 10 is formed on an upper side of the crosspiece 8.

In the exemplary embodiment, the crosspiece 8 is substantially a tubular element or a toothed rack, preferably with a substantially rectangular cross-section.

In the exemplary embodiment, the guide portion 10 is formed integrally with the upper side of the crosspiece 8 or the guide portion 10 is provided by the upper side of the crosspiece 8. The track teeth 11 can be formed, preferably stamped, from the upper surface of the crosspiece 8 using known measures or can be suitably connected to the upper surface of the crosspiece 8.

According to the invention, the track teeth 11 extend in an arc from a first longitudinal edge 12 of the crosspiece 8 towards a second longitudinal edge 13 of the crosspiece 8.

In the exemplary embodiment, it is preferably provided that the track teeth 11 are arranged in a uniform grid dimension. It is advantageous if an offset Z (see FIG. 19) by which two adjacent track teeth 11 are offset from one another is 5 mm to 40 mm, preferably 6 mm to 35 mm, more preferably 6 mm to 30 mm, even more preferably 8 mm to 25 mm, very particularly preferably 10 mm to 20 mm, in particular 16 mm to 17 mm.

The track teeth 11 project beyond the upper side of the crosspiece 8.

The second clamping apparatus 7 of the turnbuckle 1 has a second clamping jaw 14.

The first clamping jaw 9 and, analogously, the second clamping jaw 14 each have two claws 9*a* and 14*a*. The distance between the claws 9*a* and 14*a*, respectively, is selected such that a horizontally extending strut 3 can be accommodated between the claws 9*a* and the claws 14*a*, respectively.

The second clamping apparatus 14 can be shifted in a tensioning direction along the longitudinal axis of the crosspiece 8 towards the first clamping jaw 9. The tensioning direction is indicated by the arrow A in FIGS. 2 and 3.

The second clamping apparatus 7 has a support tooth 15 which extends in an arc and can be rotated about a rotational shaft 16.

By means of a screwing-in movement, the support tooth 15 can be screwed into a track 17 between two track teeth 11 and can be brought into engagement with one of the track teeth 11.

An incline of the arc extension of the support tooth 15 and an incline of the arc extension of the track teeth 11 are matched to one another such that, after the support tooth 15 is brought into engagement with a track tooth 11, a further screwing-in movement of the support tooth 15 applies a force to the second clamping apparatus 7, which force is suitable for pressing the second clamping apparatus 7 in the tensioning direction.

Figure 16:
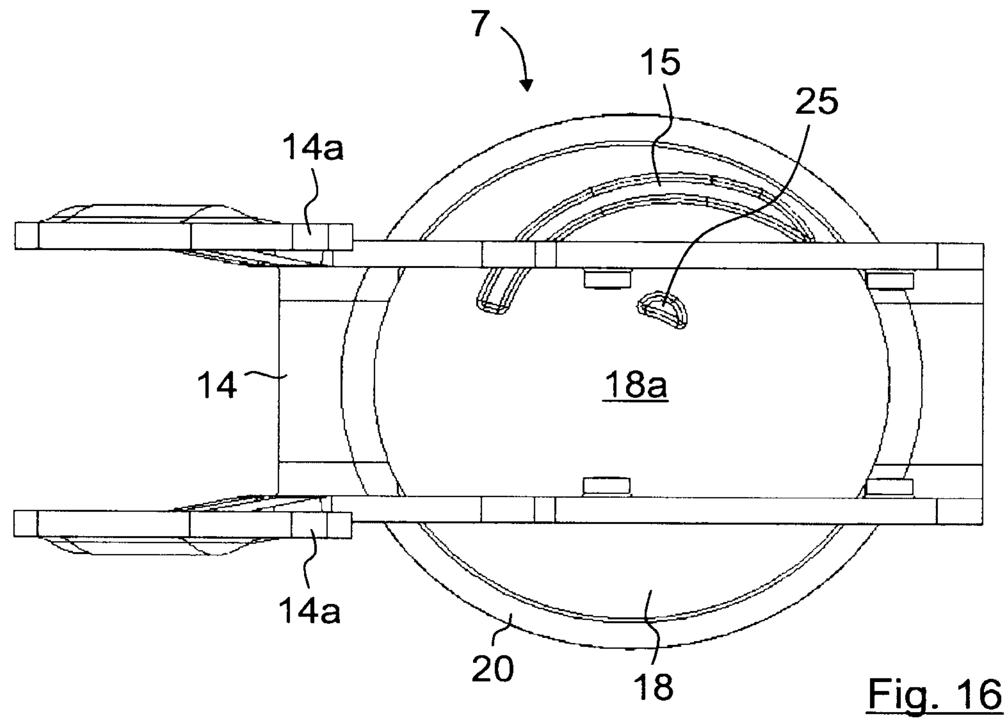
FIG. 16 a view of an underside of a clamping apparatus of a turnbuckle, in a configuration with a support tooth and a catch tooth.
Figure 17:
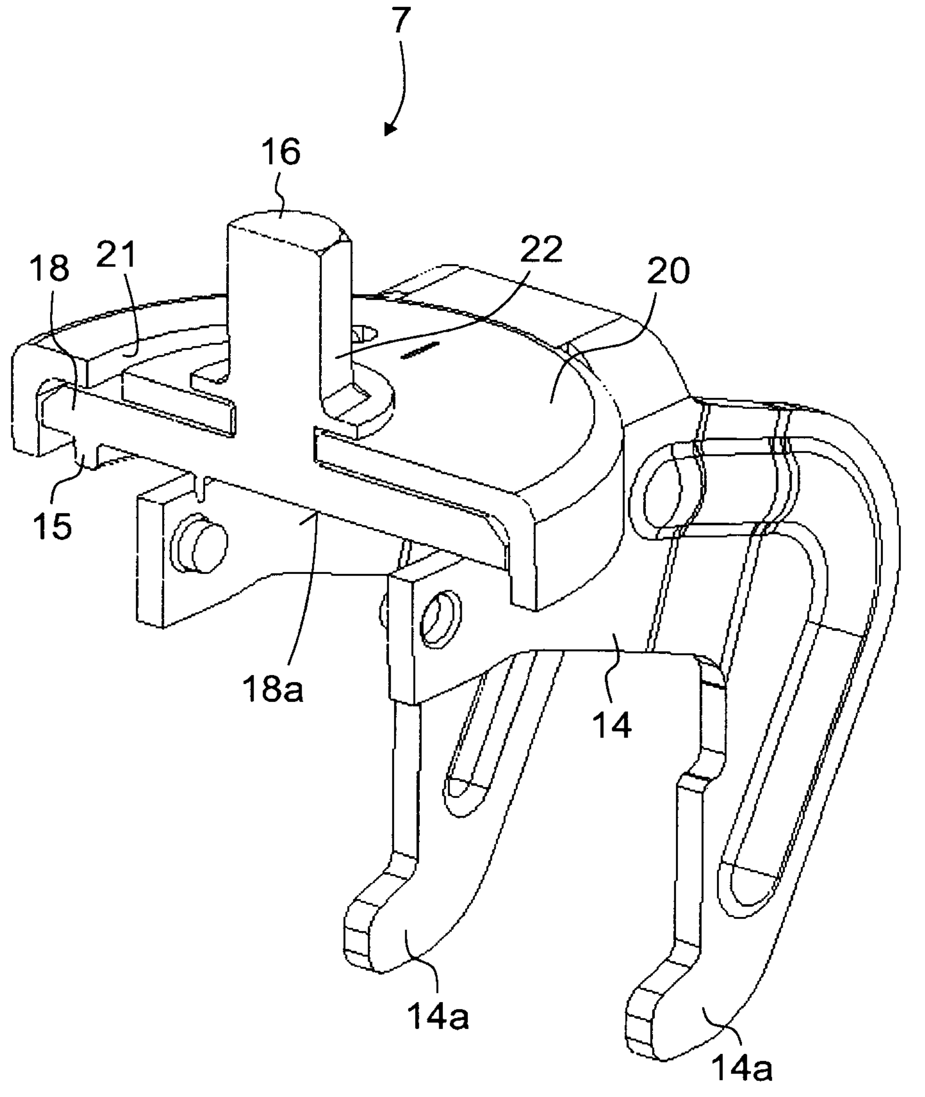
FIG. 17 a section through the second clamping apparatus according to FIG. 15.
Figure 18:
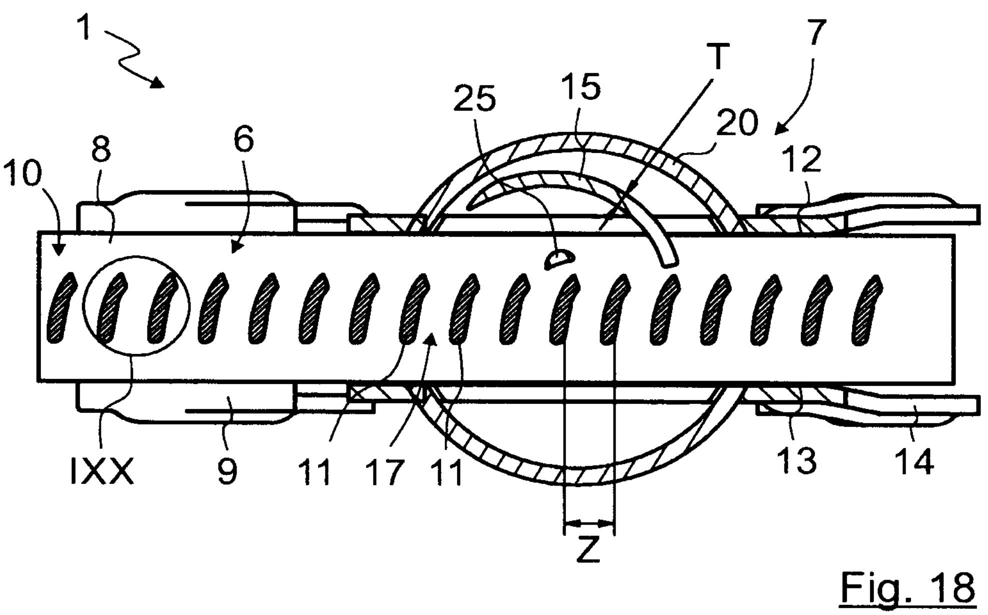
FIG. 18 a plan view of a turnbuckle in a sectional illustration which shows the turnbuckle in a configuration with a support tooth and a catch tooth.

The screwing in of the support tooth 15 in a track 17 between two track teeth 11 is illustrated in FIGS. 3 to 7, in FIGS. 9 to 14, in FIG. 16 and in FIG. 18. A particularly good illustration of different positions of the support tooth 15 can be seen in FIGS. 9 to 14.

FIGS. 3 to 8 and FIGS. 9 to 19 show two different embodiments of the turnbuckle 1. What is common to both embodiments is that the support tooth enters a track 17 between two track teeth 11; in addition, further measures illustrated in FIG. 3 to 8 or 9 to 19 can be added, which will be explained in more detail below.

Figure 2:
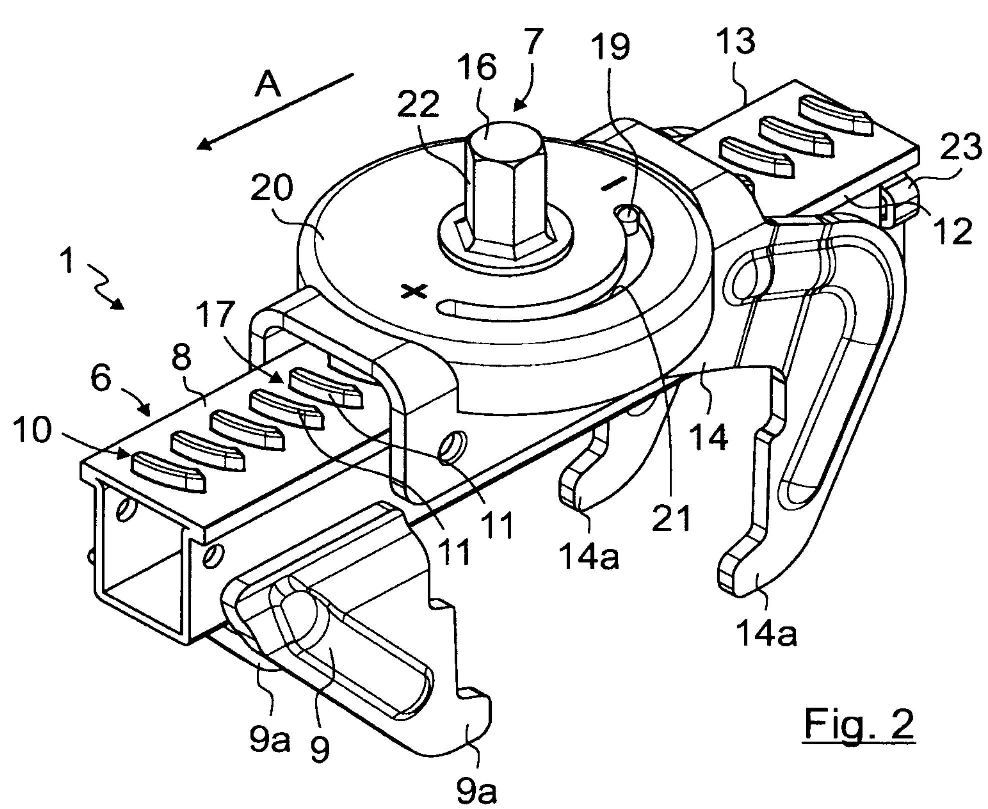
FIG. 2 a perspective illustration of a turnbuckle.
Figure 3:
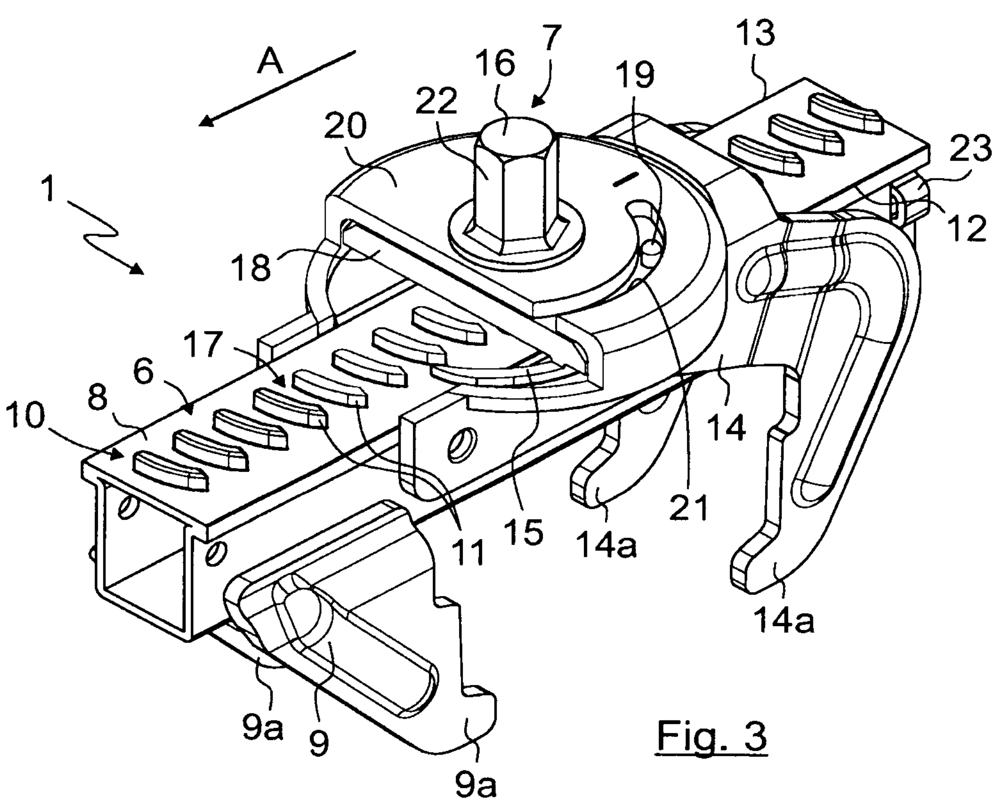
FIG. 3 a perspective illustration of a turnbuckle according to FIG. 1 with a partial section through a housing part and a rotary disk of a second clamping apparatus of the turnbuckle.
Figure 4:
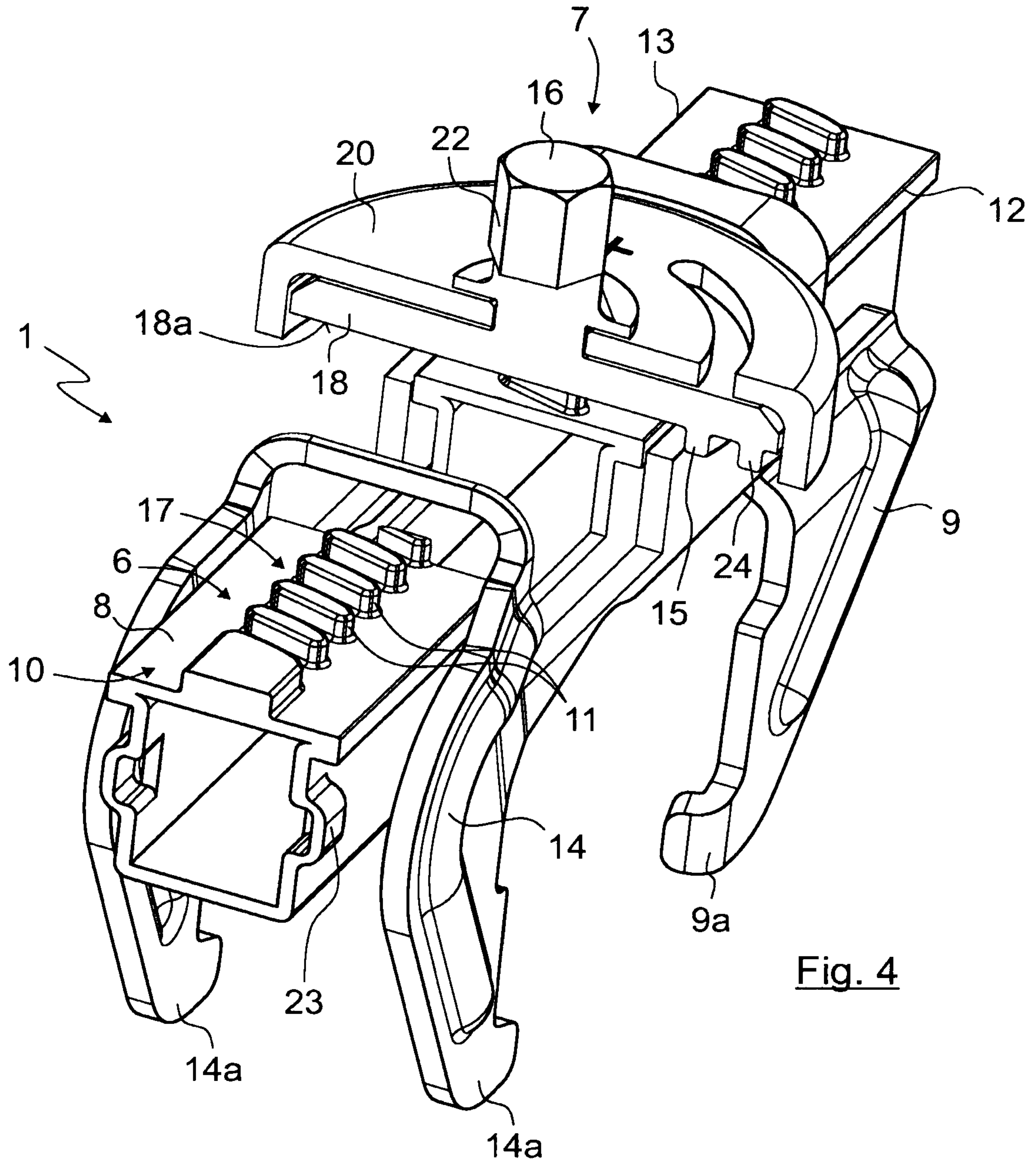
FIG. 4 a perspective illustration of a turnbuckle according to FIG. 1 with a partial section.

The exemplary embodiment according to FIGS. 2 to 4 further differs from the exemplary embodiment according to FIGS. 5 to 8 in that the arc extension of the track teeth 11 is different (as viewed in the image plane, from left to right or from right to left). However, this has no influence on the function in principle. Therefore, this difference will not be discussed in more detail below.

The arc extension of the support tooth 15 and/or the arc extension of the track teeth 11 is, preferably at least in sections, and in the exemplary embodiment completely, an involute. In this case, the arc extension of the support tooth 15 and the arc extension of the track teeth 11 has a curvature at each point such that an involute is obtained.

As can be seen from the figures, the arc extension of the support tooth is an involute with respect to the rotational shaft 16 about which the support tooth 15 rotates.

As illustrated in the exemplary embodiments according to FIGS. 2 to 19, the second clamping apparatus 7 has a rotary disk 18. In this case, the support tooth 15 is formed on a main surface 18*a* of the rotary disk 18, which in the exemplary embodiment is the underside of the rotary disk 18.

In the exemplary embodiment, the rotational shaft 16 about which the support tooth 15 is rotatable is the rotational shaft of the rotary disk 18. That is, by rotating the rotational shaft 16 of the rotary disk 18, the support tooth 15 can be rotated in particular in such a way that the support tooth 15 is screwed into a track 17 between two track teeth 11 by a screwing-in movement.

The rotary disk 18 is arranged in the width direction of the crosspiece 8 such that the rotational shaft 16 of the rotary disk 18 is located centrally between the longitudinal edges 12, 13 of the crosspiece 8 and extends orthogonally to an upper side of the crosspiece 8.

As can be seen in particular from FIGS. 2, 3 and 9 to 15, the second clamping apparatus 7 has a stop 19 which limits the screwing-in movement of the support tooth 15. In the exemplary embodiment, the stop 19 is designed as a stop pin.

The rotary disk 18 is rotatably accommodated in a housing part 20 of the second clamping apparatus 7. In this case, the housing part 20 is immovably or rigidly or fixedly connected to the second clamping jaw 14.

As illustrated in the exemplary embodiments according to FIGS. 2 to 19, the housing part 20 has a circular arc-shaped recess 21 within which the stop pin 19 is movable. The stop pin 19 and the recess 21 thus serve as rotation angle indicators. As further illustrated, the housing part 20 can be provided with a designation, so that it can be seen in which position the support tooth 15, whose position is indicated by the stop pin 19, is located. For this purpose, the housing part 20 can preferably bear the designation "–" or "+".

The circular arc-shaped recess 21 can preferably extend through an angle range of 10 to 180 degrees, in particular 50 to 150 degrees. In the exemplary embodiment, it is illustrated that the circular recess 21 extends over an angle range of 120 to 160 degrees. The circular recess 21 thus limits the movement of the support tooth 15 to an appropriate angle range.

The circular arc-shaped recess 21 in the housing part 20 is designed such that the position of the stop pin 19 within the circular arc-shaped recess 21 is visible to the operator when operating the rotary disk 18. The circular arc-shaped recess 21 is thus preferably formed on the upper side of the housing part 20 facing away from the rotary disk 18.

The rotational shaft 16 of the rotary disk 20 has an input member 22 on which a tool can be placed in order to rotate the rotary disk 18. The input member 22 can be designed, for example, as a sleeve or tube stub. In the exemplary embodiment, it is provided that the input member 22 has a profile which can be operated by means of a polygonal drive, in the exemplary embodiment a hexagon drive. Alternatively, the input member 22 can also be designed such that it can be operated by a hammer tip or an anchor rod, in particular a Dywidag bar. For this purpose, the input member 22 can have, for example, a correspondingly suitable bore.

In the exemplary embodiment, it is provided that the second clamping apparatus 7 is captively connected to the crosspiece 8 of the first clamping apparatus 6. For this purpose, it is provided in the exemplary embodiment that the crosspiece 8 has corresponding formations 23 or, in general, limiting stops, which can also be pins or edges which interact with corresponding complementary elements on the second clamping apparatus 7 in such a way that the second clamping apparatus 7 cannot be pulled off the crosspiece 8. A captive fastening mechanism in the tensioning direction can preferably already be achieved by the first clamping jaw 9 and the second clamping jaw 14 colliding with one another, i.e. being in the path of one another in the tensioning direction.

In the exemplary embodiment according to FIGS. 2 to 17, it is provided that the arc extension of the support tooth 15 is selected such that the support tooth 15 can be rotated into a release position in which the support tooth 15 does not impede a movement of the second clamping apparatus 7 in or against the tensioning direction.

It is provided in this case that the second clamping apparatus 7 can be shifted along the guide portion 10 of the first clamping apparatus 6 when the support tooth 15 is not in engagement with one of the track teeth 11. This makes it possible to perform a quick adjustment. A release position of the support tooth 15 is illustrated in FIGS. 2, 7, 9, 10 and 15 to 18. In the figures, this is also partially represented by the stop pin 19 being rotated to the end of the circular arc-shaped recess 21 marked "–".

In the exemplary embodiment, the arc extension of the track teeth 11 is selected such that the track teeth 11 allow continuous adjustment. The track teeth 11 are designed or arranged such that the end of a track tooth 11 corresponds to the beginning of an adjacent track tooth 11.

Figure 5:
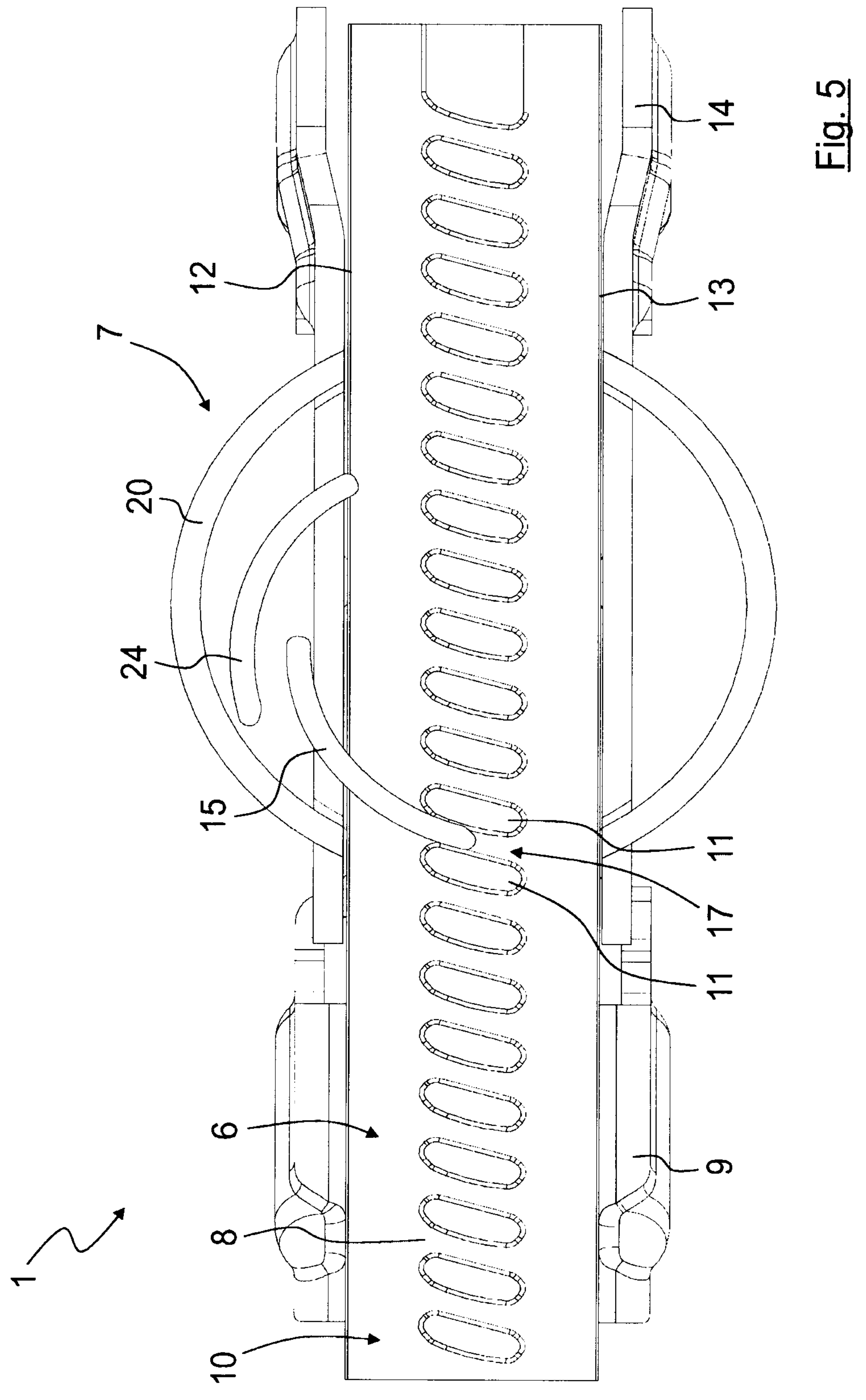
FIG. 5 a plan view of a turnbuckle in a sectional illustration which shows the turnbuckle in a configuration with a support tooth and a secondary support tooth.
Figure 6:
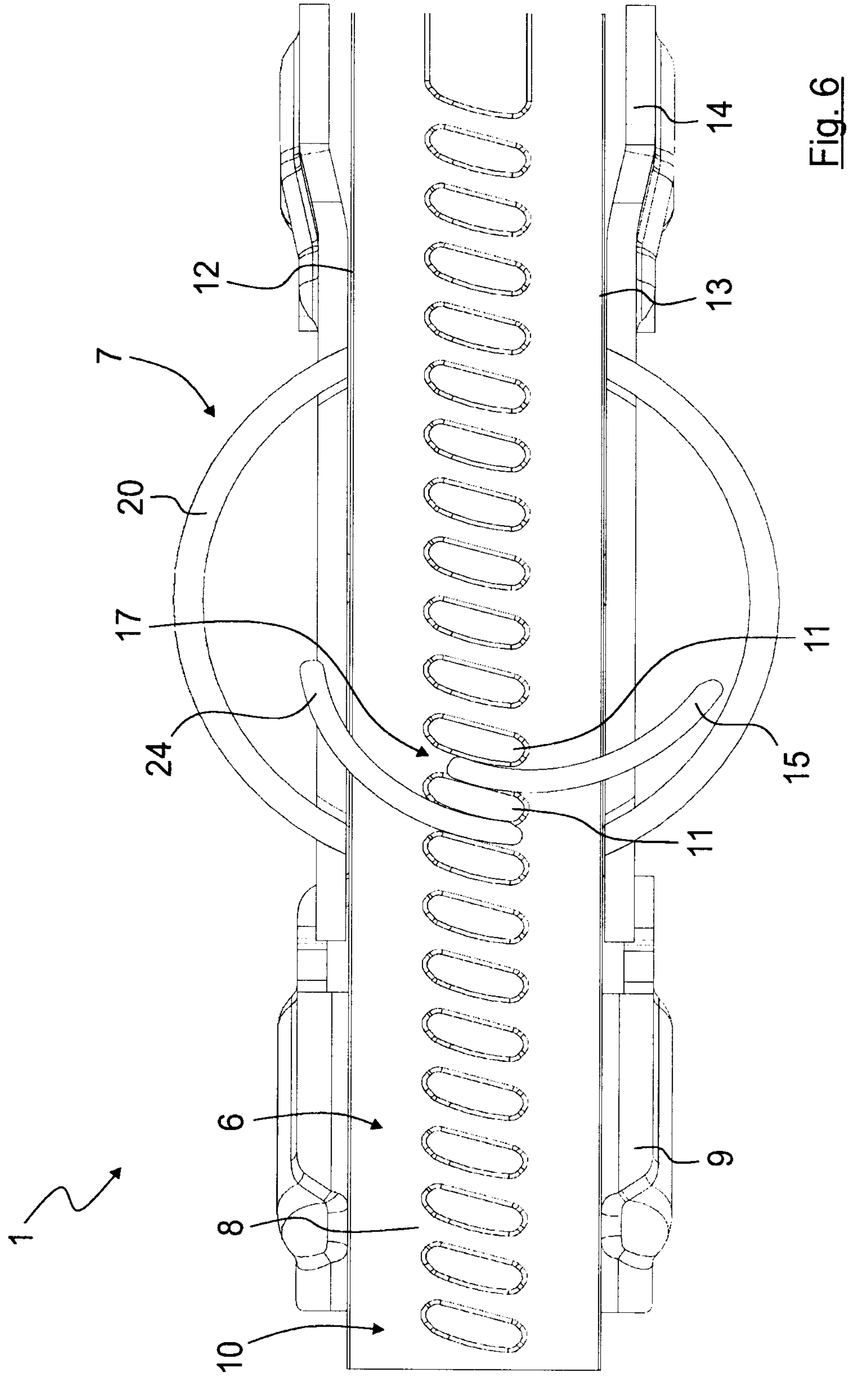
FIG. 6 an illustration according to FIG. 5, wherein the support tooth and the secondary support tooth are in engagement with a track tooth in each case.
Figure 7:
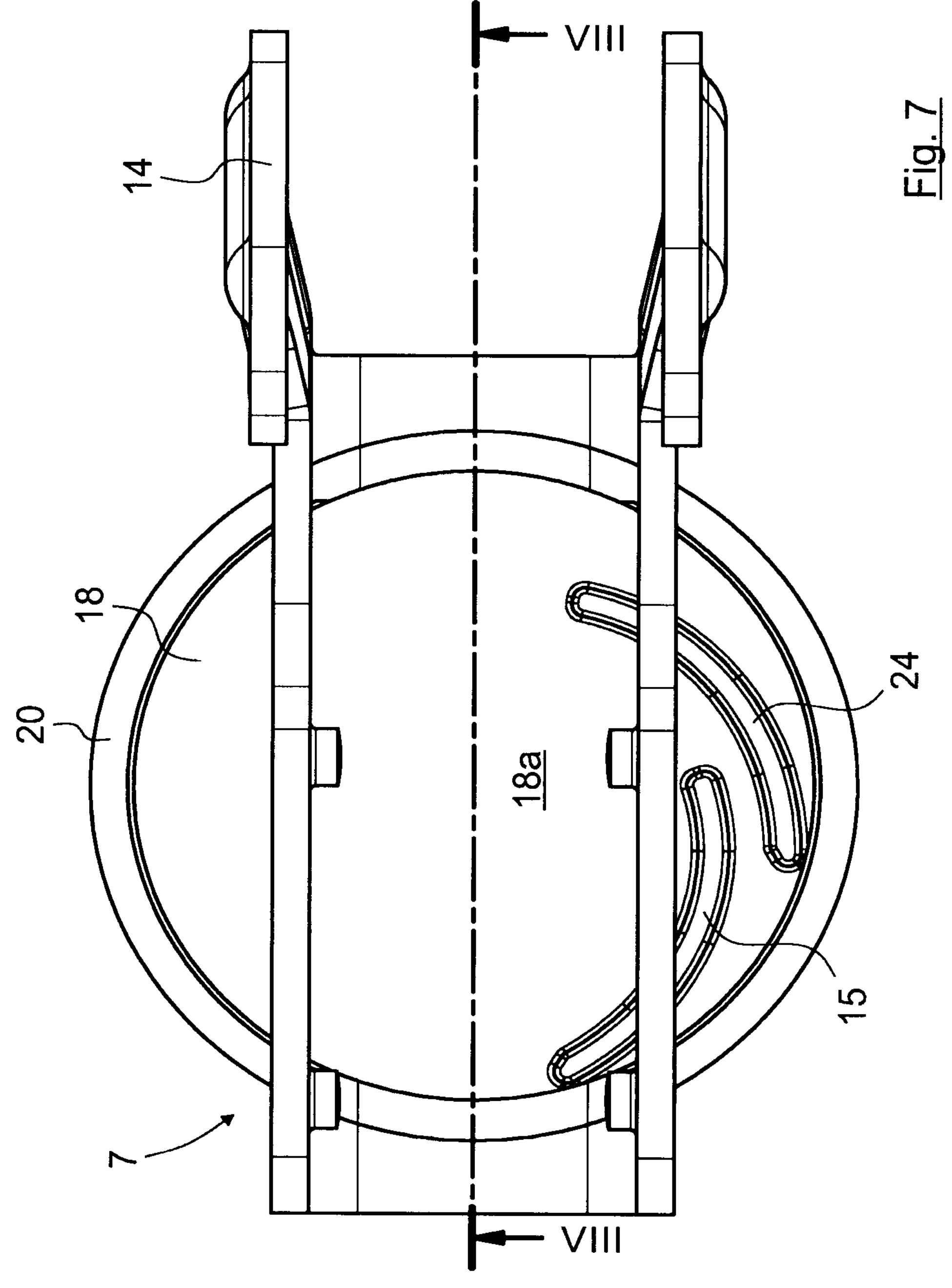
FIG. 7 a view of an underside of a second clamping apparatus of a turnbuckle in a configuration with a support tooth and a secondary support tooth.
Figure 8:
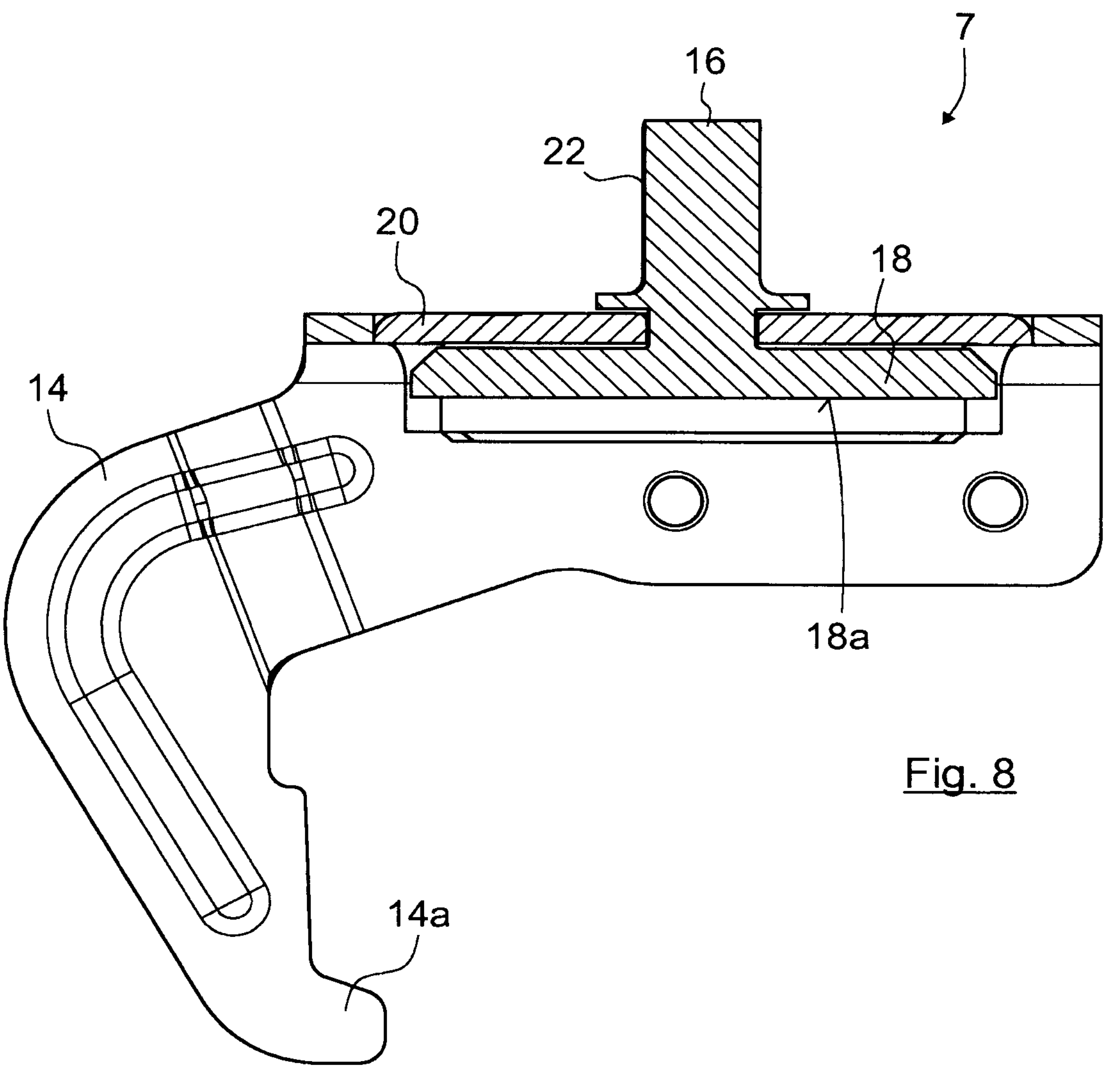
FIG. 8 a cross-section through a second clamping apparatus of a turnbuckle.

FIGS. 2 to 8 illustrate a variant of the turnbuckle 1 in which the second clamping apparatus 7 has a secondary support tooth 24 which extends in an arc. By means of the screwing-in movement, the secondary support tooth 24 can be screwed into one of the tracks 17 between two track teeth 11 and can be brought into engagement with one of the track teeth 11. As illustrated in FIGS. 5 and 6, the secondary support tooth 24 preferably engages on a track tooth 11 which is adjacent to the track tooth 11 on which the support tooth 15 engages. In the exemplary embodiment it is provided that the support tooth 15 is arranged running ahead of the secondary support tooth 24 in the screwing-in direction. However, a reverse arrangement can also be selected here.

In the exemplary embodiment, the support tooth 15 and the secondary support tooth 24 are each designed as an involute.

FIGS. 2 to 8 also serve as a disclosure for a variant of the turnbuckle 1 in which only one support tooth 15 and no secondary support tooth 24 are provided. In the variant in which only one support tooth 15 and no secondary support tooth 24 are provided, all features can be designed exactly as described with respect to the variants with the support tooth 15 and the secondary support tooth 24 illustrated in FIGS. 2 to 8. In an embodiment with only one support tooth 15, the support tooth 15 can be provided both by the support tooth 15 and by the secondary support tooth 24 according to FIGS. 2 to 8.

FIGS. 9 to 19 show a further variant of the turnbuckle 1. In this case, it is provided that the second clamping apparatus 7 has a catch tooth 25 which is rotatable together with the support tooth 15. In this case, the catch tooth 25 runs ahead of the support tooth 15 in the screwing-in direction, so that the catch tooth 25 first enters one of the tracks 17 between two track teeth 11.

The offset between two adjacent track teeth 11 and the offset between the catch tooth 25 and the support tooth 15 in the tensioning direction is designed such that, when the catch tooth 25 enters a track 17 between two track teeth 11, the support tooth 15 enters a further track 17 between two track teeth 11, which track is offset in the tensioning direction, without colliding with an end face of one of the track teeth 11.

In the exemplary embodiment, it is provided that the catch tooth 25 has a length that is less than 50%, preferably less than 40%, more preferably less than 30%, even more preferably less than 20%, in particular less than 10%, of the length of the arc extension of the support tooth 15.

The features described with respect to FIGS. 9 to 19 can in principle also be achieved or implemented in the exemplary embodiment according to FIGS. 2 to 8, irrespective of whether only one support tooth 15 or one support tooth and one secondary support tooth 24 are provided.

Conversely, it is also the case that the features described with respect to FIGS. 2 to 8 can also be implemented in the embodiment according to FIGS. 9 to 19 with the catch tooth 25.

Figure 9:
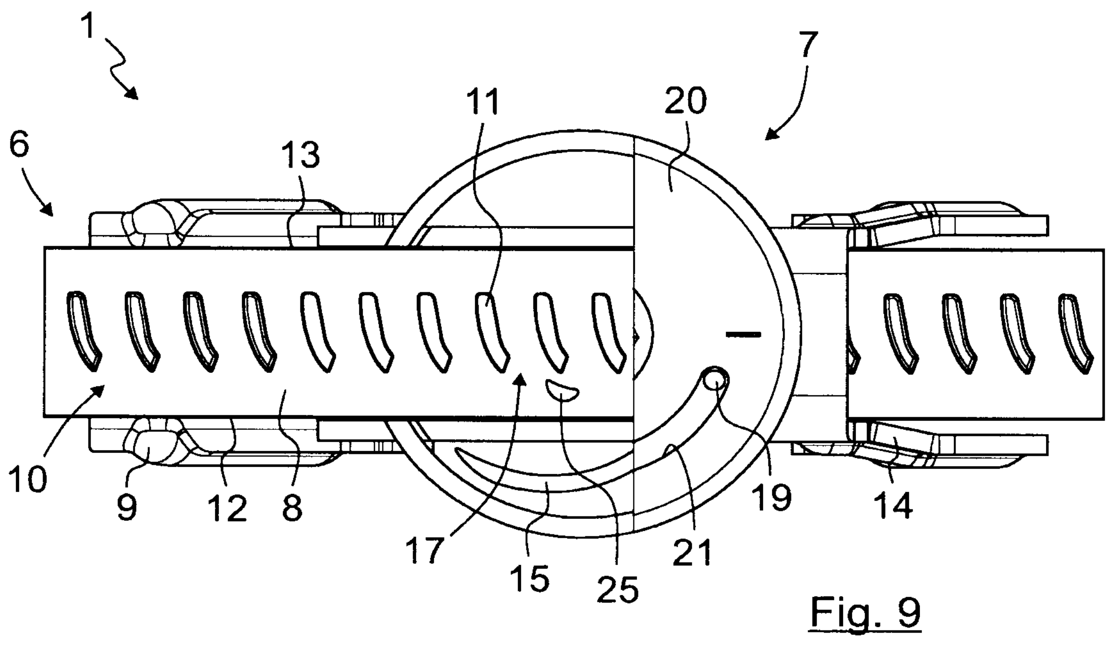
FIG. 9 a plan view of a turnbuckle with a partial section through a housing and a rotary disk of a second clamping apparatus in a configuration with a support tooth and a catch tooth in a release position.
Figure 10:
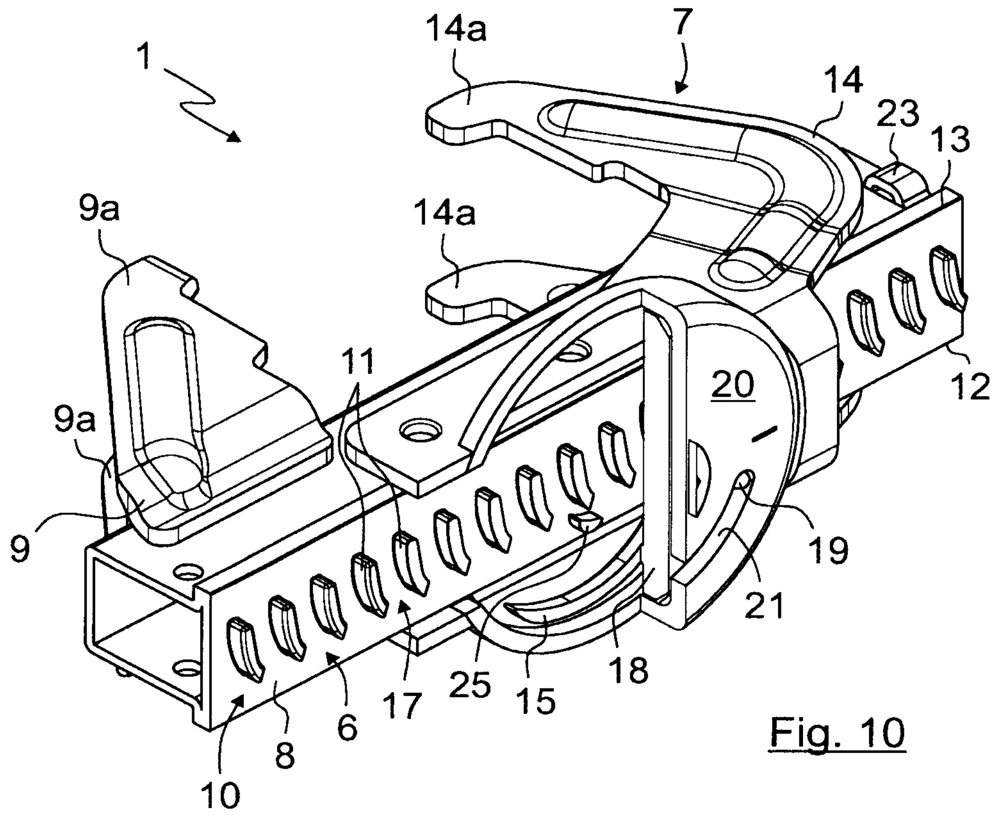
FIG. 10 a perspective illustration of the turnbuckle according to FIG. 9.

FIGS. 9 and 10 show an illustration of the turnbuckle 1 in which the support tooth 15 is in a release position, that is to say that the second clamping apparatus 7 is movable along the guide portion or along the longitudinal axis of the crosspiece 8 within the limits which are predetermined by the captive fastening mechanism.

Figure 11:
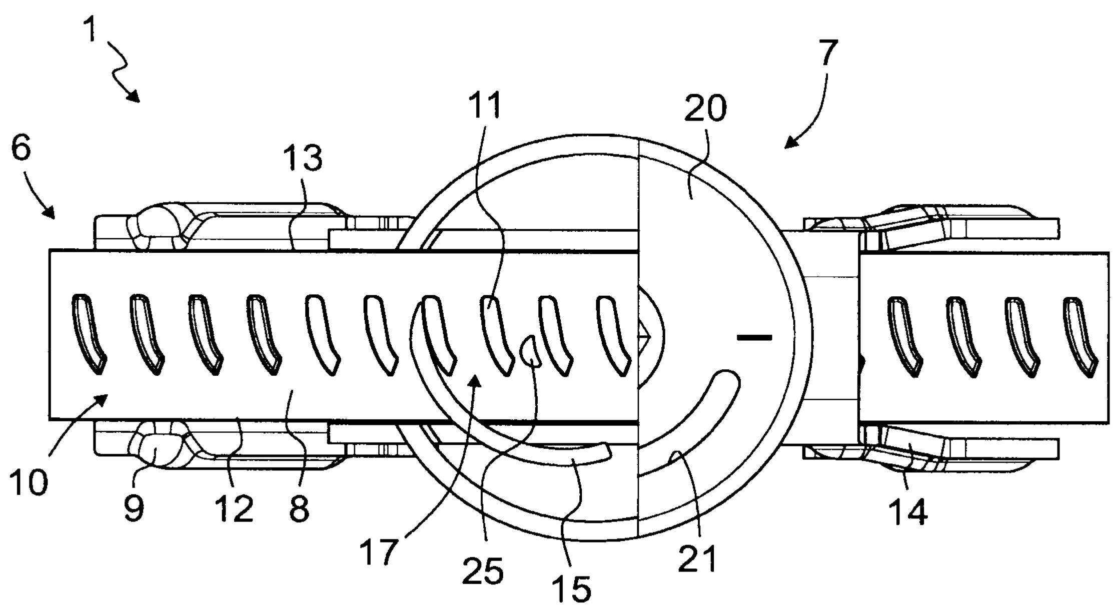
FIG. 11 an illustration according to FIG. 9 in a position in which the catch tooth and the support tooth are each entered in a track between the track teeth.
Figure 12:
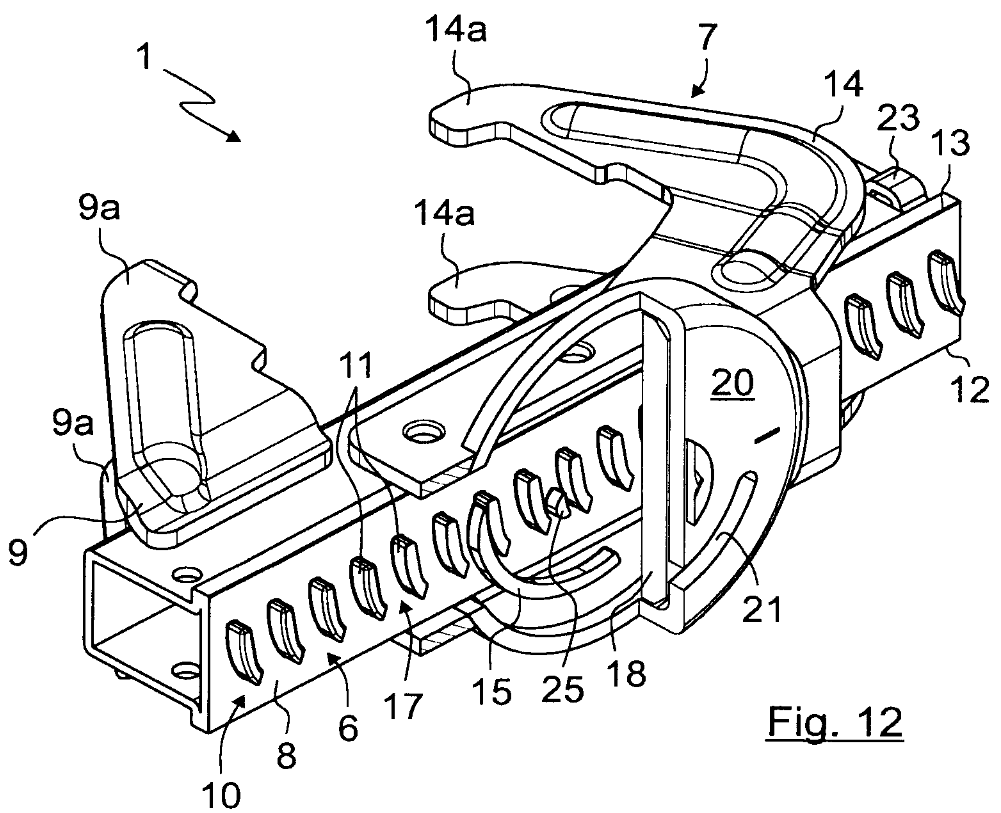
FIG. 12 a perspective illustration of the turnbuckle according to FIG. 11.

FIGS. 11 and 12 show an illustration of the turnbuckle 1 in which the support tooth 15 is entered partially into a track 17 between two track teeth 11. In this case, it is provided that the catch tooth 25 initially enters a track 17. The catch tooth 25 is not in engagement with one of the track teeth 11, whereas the support tooth 15 is in engagement with one of the track teeth 11.

Figure 13:
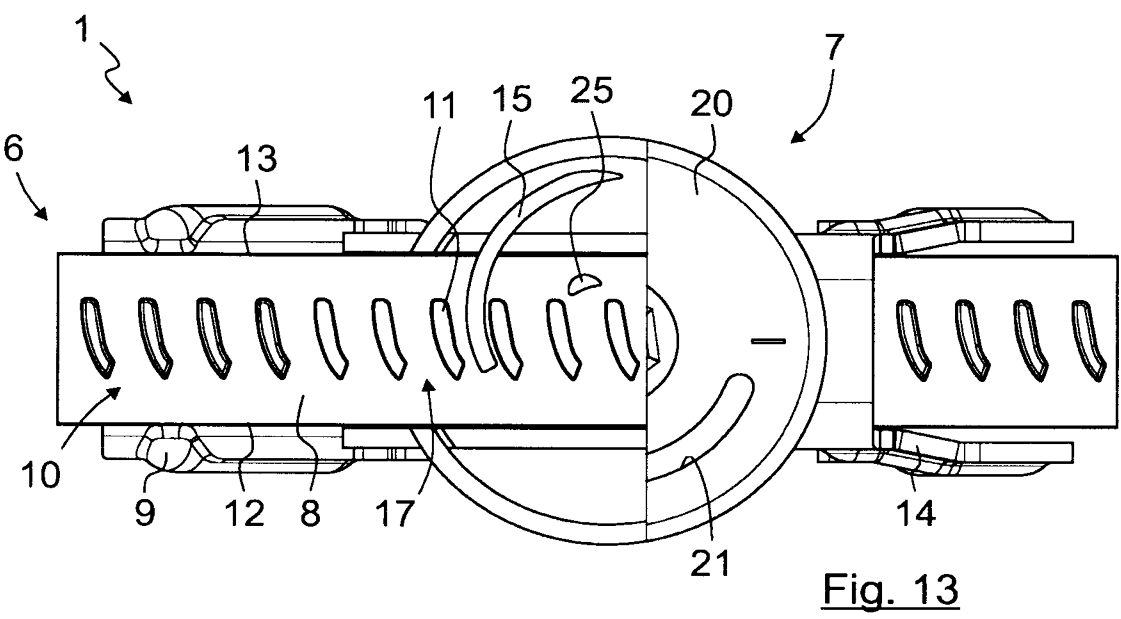
FIG. 13 an illustration according to FIG. 9 in a position in which the support tooth is entered up to its end position in a track between two track teeth.
Figure 14:
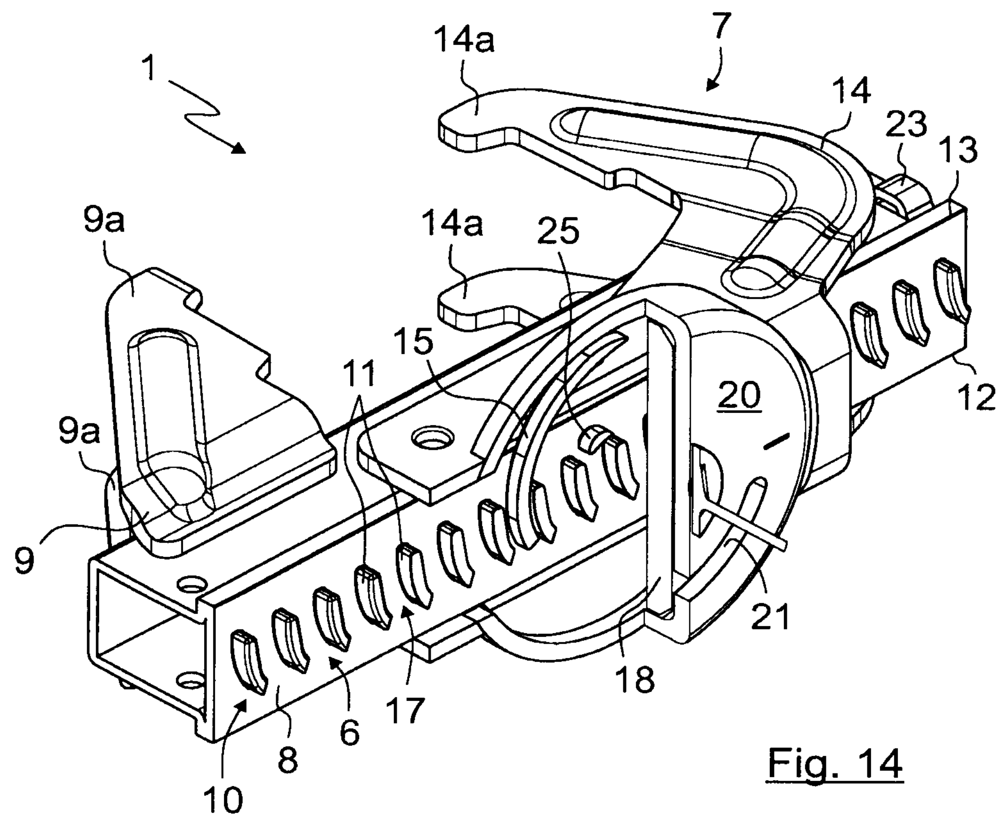
FIG. 14 a perspective illustration of the turnbuckle according to FIG. 13.
Figure 15:
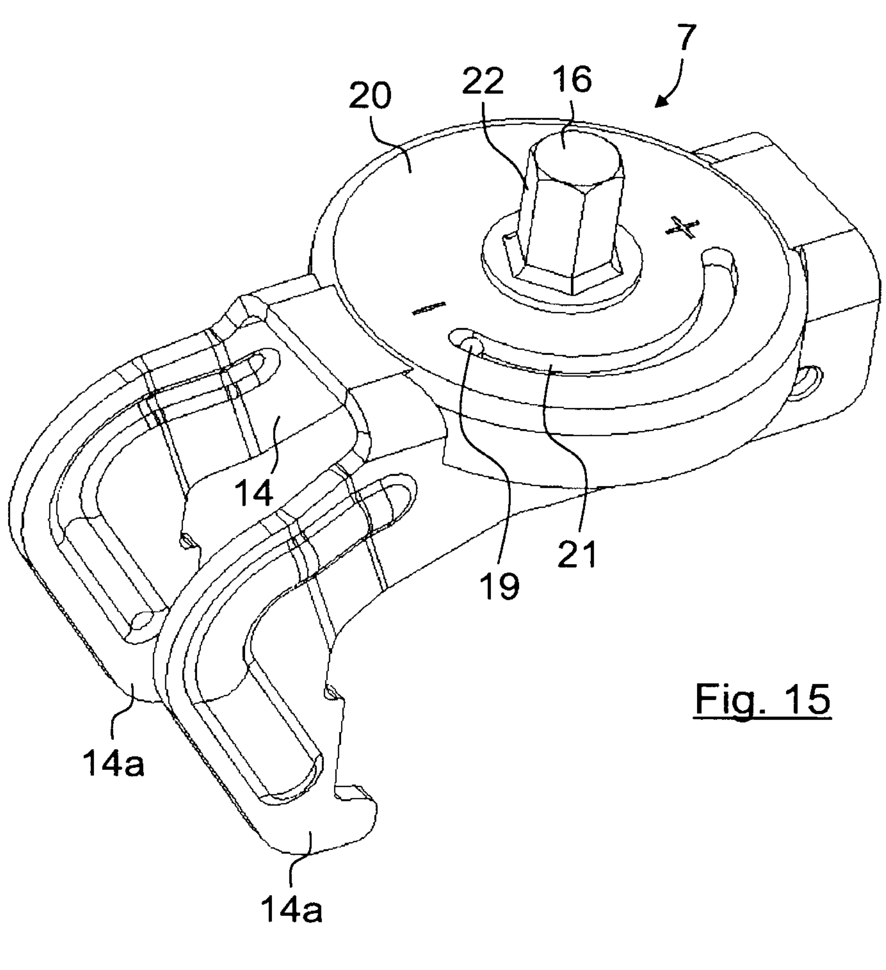
FIG. 15 a perspective illustration of a second clamping apparatus of the turnbuckle.

FIGS. 13 and 14 show an illustration of the turnbuckle 1 in which the support tooth 15 is in the end position opposite from the release position, i.e. the support tooth 15 is fully screwed into the track 17. Should the force with which the frame formwork elements 2 are tensioned in the end position not be sufficient, the support tooth 15 is again screwed out of the track 17, the clamping apparatus is then shifted further in the release position towards the tensioning direction, so that the support tooth 15 can be screwed again into an adjacent track 17 located further forward in the tensioning direction, which then results in a correspondingly higher tensioning force.

It has been found to be particularly suitable if a span of a distance between the first clamping jaw 6 and the second clamping jaw 7 is 0 mm to 400 mm, preferably 0 mm to 300 mm, particularly preferably 0 mm to 250 mm.

In a manner not illustrated in greater detail, it can also be provided that the rotary disk 18 is designed as an eccentric disk or the rotary disk 18 has an eccentrically arranged rotational shaft 16 in such a way that, when the support tooth 15 is screwed into a track 17 between two track teeth 11 by a screwing-in movement and is brought into engagement with one of the track teeth 11, a further screwing-in movement of the support tooth 15 causes the support tooth 15 to apply a force to the track tooth 11 with which it is in engagement, which force is suitable for pressing the second clamping apparatus 7 in the tensioning direction.

Figure 19:
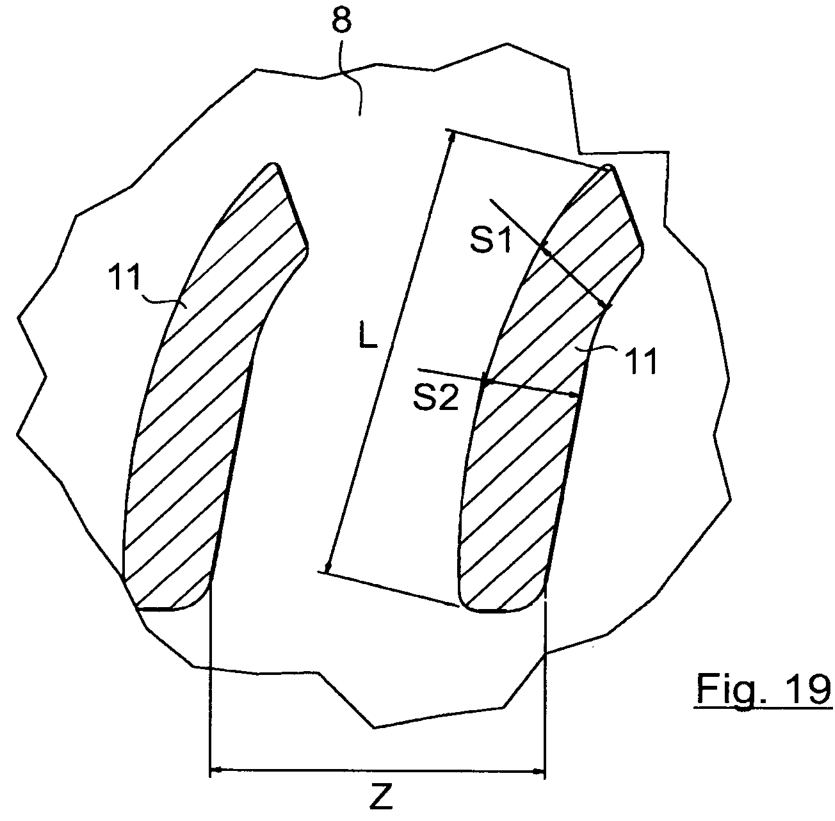
FIG. 19 an enlarged illustration of the detail IXX of FIG. 18.

FIGS. 18 and 19 show further details, in particular advantageous dimensions, regarding the catch tooth 25, the support tooth 15 and the track teeth 11. The details and in particular the dimensions can be advantageous for all the exemplary embodiments and variants illustrated in FIGS. 2 to 17. In particular, it can be provided that the secondary support tooth 24 is designed as explained below with respect to the support tooth 15.

The catch tooth 25 illustrated in FIG. 19 preferably has a maximum thickness of 3.5 mm to 5 mm, preferably 3.8 mm to 4.8 mm, in particular 4.3 mm, optionally +/−0.2 mm. The distance between the beginning and the end of the catch tooth 25, i.e. the two tips, is preferably 6 mm to 15 mm, more preferably 8 mm to 12 mm, in particular 9.6 mm, optionally +/−0.4 mm. The distance between the beginning and the end of the catch tooth 25 is measured as explained below with respect to the measurement of the distance L between the beginning and the end of one of the track teeth 11.

The support tooth 15 (see FIG. 18) preferably has a maximum thickness T of 4 mm to 7 mm, preferably 4 mm to 6 mm, in particular 5 mm, optionally +/−0.2 mm. The distance between the beginning and the end of the support tooth 15, i.e. the two tips, is preferably 50 mm to 80 mm, more preferably 60 mm to 75 mm, in particular 68.9 mm, optionally +/−2 mm. The distance between the beginning and the end of the support tooth 15 is measured as explained below with respect to the measurement of the distance L between the beginning and the end of one of the track teeth 11.

As can be seen from FIGS. 18 and 19, preferably the majority of the track teeth 11, particularly preferably all of the track teeth 11, have a thickness which varies along the length of the track teeth 11. Preferably the majority of the track teeth 11, particularly preferably all of the track teeth 11, have a maximum thickness S1, S2 in the range of 3.5 mm to 7 mm, preferably 4 mm to 6 mm, in particular 4.6 to 5 mm. Preferably, the thickness S1 of the track teeth 11 in a first more curved portion is 4 mm to 5 mm, in particular 4.6 mm, optionally +/−2 mm. Further preferably, the thickness S2 of the track teeth 11 in a second less curved portion is 0.2 mm to 1 mm, in particular 0.4 mm more than in the first more curved portion. In an advantageous exemplary embodiment, S1 is 4.6 mm optionally +/−0.2 mm and S2 is 5 mm optionally +/−0.2 mm.

The distance between the beginning and the end of one of the track teeth, i.e. its two tips, is preferably 15 mm to 40 mm, more preferably 20 mm to 30 mm, in particular 24 mm, optionally +/−2 mm. The distance is illustrated in FIG. 19 with the reference sign L. Furthermore, FIG. 19 illustrates how the distance is to be measured.

Because the rotational shaft 16 extends orthogonally to the upper side of the crosspiece 8, the turnbuckle 1 can be operated in a particularly advantageous manner. Furthermore, the turnbuckle 1 can be produced in a particularly simple manner with a rotational shaft 16 arranged in such a way; in particular, the track teeth 11 can be formed particularly advantageously on the upper side of the crosspiece 8.

The first longitudinal edge of the crosspiece 8 and the second longitudinal edge of the crosspiece 8 delimit the crosspiece 8 in the width direction (transversely to the longitudinal axis).

The upper side of the crosspiece 8 is formed between the first longitudinal edge of the crosspiece 8 and the second longitudinal edge of the crosspiece 8.

The upper side of the crosspiece 8 is the surface or side of the crosspiece 8 facing away from an underside of the crosspiece 8, which is used for bearing against the frame formwork elements 2 to be tensioned.

The crosspiece 8 is preferably a tube, in particular a rolled tube, wherein the track teeth 11 are formed on the upper side, preferably by profiling the tube. The underside of the crosspiece 8 facing away from the upper side is preferably used for bearing against the frame formwork elements 2 to be tensioned. The crosspiece 8 preferably further has two side surfaces which extend orthogonally to the upper side and which preferably extend plane-parallel to one another in order to connect the upper side of the crosspiece 8 to the underside of the crosspiece 8. Preferably, the upper side, the underside and the two side surfaces form a rectangle when viewed in the cross-section 8 of the crosspiece.

The support tooth 15 is formed on a main surface 18*a* of the rotary disk 16, which constitutes a lower side of the rotary disk 18, i.e. faces the crosspiece 8. The underside of the rotary disk 18 or the main surface 18*a* extends plane-parallel to the upper side of the crosspiece 8.

The screwing-in movement of the support tooth 15 extends in a plane which extends plane-parallel to the upper side or the surface of the crosspiece 8.

The clamping surfaces of the first clamping jaw 9 and the second clamping jaw 14 project beyond the underside of the crosspiece 8. In this case, it can be provided that the first clamping jaw 9 and/or the second clamping jaw 14 have, preferably in each case at their ends, claws 9*a* and 14*a*, preferably two claws 9*a* and 14*a* respectively, preferably such that two frame formwork elements 2 to be tensioned together are tensioned between the underside of the crosspiece 8 and the clamping jaws 9, 14, preferably between the clamping surfaces thereof and in particular the claws 9*a*, 14*a*.

The invention claimed is:

1. A turnbuckle for tensioning frame formwork elements, the turnbuckle comprising a first clamping apparatus which has a crosspiece and a first clamping jaw, wherein the crosspiece has a guide portion comprising a row of track teeth which are arranged behind one another and extend in parallel with one another, and comprising a second clamping apparatus which has a second clamping jaw, wherein the second clamping apparatus can be shifted in a tensioning direction along the longitudinal axis of the crosspiece towards the first clamping jaw, wherein, the track teeth extend in each case in an arc from a first longitudinal edge of the crosspiece towards a second longitudinal edge of the crosspiece, and wherein the second clamping apparatus has at least one support tooth which extends in an arc and can be rotated about a rotational shaft, wherein the rotational shaft extends orthogonally to an upper side of the crosspiece, wherein by means of a screwing-in movement, the support tooth can be screwed into a track between two track teeth and can be brought into engagement with one of the track teeth, and wherein an incline of the arc extension of the support tooth and an incline of the arc extension of the track teeth are matched to one another such that, after the support tooth is brought into engagement with a track tooth, a further screwing-in movement of the support tooth applies a force to the second clamping apparatus, which force is suitable for pressing the second clamping apparatus in the tensioning direction, wherein, the second clamping apparatus has a rotary disk, wherein the support tooth is formed on a main surface of the rotary disk and the rotational shaft about which the support tooth is rotatable is the rotational shaft of the rotary disk, wherein, the rotary disk is arranged in the width direction of the crosspiece such that the rotational shaft of the rotary disk is located centrally between the longitudinal edges of the crosspiece and extends orthogonally to an upper side of the crosspiece.

2. The turnbuckle according to claim 1, wherein, the arc extension of the support tooth and/or the arc extension of the track teeth is, at least in sections or completely, an involute.

3. The turnbuckle according to claim 2, wherein, the arc extension of the support tooth and/or the arc extension of the track teeth has a curvature at each point such that an involute is obtained.

4. The turnbuckle according to claim 2, wherein, the arc extension of the support tooth is an involute with respect to the rotational shaft about which the support tooth rotates.

5. The turnbuckle according to claim 1, wherein, a stop or a stop pin, is provided which limits the screwing-in movement of the support tooth.

6. The turnbuckle according to claim 5, wherein, the rotary disk is rotatably accommodated in a housing part of the second clamping apparatus, wherein the housing part is immovably connected to the second clamping jaw and wherein the housing part has a circular arc-shaped recess within which the stop is movable.

7. The turnbuckle according to claim 6, wherein, the circular arc-shaped recess in the housing part is designed such that the position of the stop within the circular arc-shaped recess is visible to the operator when operating the rotary disk.

8. The turnbuckle according to claim 1, wherein, the rotational shaft of the rotary disk has an input member, a sleeve, or a tube stub, on which a tool can be placed in order to rotate the rotary disk.

9. The turnbuckle according to claim 8, wherein, the input member of the rotational shaft has a profile which can be operated by means of one of: a polygonal drive, a hexagon drive, a hammer tip, an anchor rod, or a Dywidag bar.

10. The turnbuckle according to claim 1, wherein, the track teeth are arranged in a uniform grid dimension.

11. The turnbuckle according to claim 1, wherein, an offset by which two adjacent track teeth are offset from one another is one of: 5 mm to 40 mm, 6 mm to 35 mm, 6 mm to 30 mm, 8 mm to 25 mm, 10 mm to 20 mm, or 16 mm to 17 mm.

12. The turnbuckle according to claim 1, wherein, the second clamping apparatus is captively connected to the crosspiece of the first clamping apparatus.

13. The turnbuckle according to claim 1, wherein, the arc extension of the support tooth is selected such that the support tooth can be rotated into a release position in which the support tooth does not impede a movement of the second clamping apparatus in or against the tensioning direction.

14. The turnbuckle according to claim 1, wherein, the second clamping apparatus can be shifted along the guide portion of the first clamping apparatus when the support tooth is not in engagement with one of the track teeth.

15. The turnbuckle according to claim 1, wherein, the arc extension and the arrangement of the track teeth are selected such that the track teeth allow continuous adjustment.

16. The turnbuckle according to claim 1, wherein, the second clamping apparatus has a catch tooth which can be screwed in together with the support tooth, wherein the catch tooth runs ahead of the support tooth in the screwing-in direction, such that the catch tooth first enters one of the tracks between two track teeth.

17. The turnbuckle according to claim 16, wherein, the offset between two adjacent track teeth and the offset between the catch tooth and the support tooth in the tensioning direction is designed such that, when the catch tooth enters a track between two track teeth, the support tooth enters a further track between two track teeth, which track is offset in the tensioning direction, without colliding with an end face of one of the track teeth.

18. The turnbuckle according to claim 16, wherein, the catch tooth has a length that is one of: less than 50%, less than 40%, less than 30%, less than 20%, or less than 10%, of the length of the arc extension of the support tooth.

19. The turnbuckle according to claim 1, wherein, the second clamping apparatus has a secondary support tooth which extends in an arc and which can be screwed into one of the tracks between two track teeth by means of the screwing-in movement and can be brought into engagement with one of the track teeth.

20. The turnbuckle according to claim 19, wherein, the support tooth and the secondary support tooth form a double involute.

21. The turnbuckle according to claim 19, wherein the one of the track teeth is a track tooth that is adjacent to the track tooth on which the support tooth engages, and wherein the support tooth is arranged running ahead of the secondary support tooth in the screwing-in direction.

22. The turnbuckle according to claim 1, wherein, the rotary disk is designed as an eccentric disk or the rotary disk has an eccentrically arranged rotational shaft.

23. The turnbuckle according to claim 1, wherein, a span of a distance between the first clamping jaw and the second clamping jaw is one of: 0 mm to 400 mm, 0 mm to 350 mm, 0 mm to 300 mm, or 0 mm to 250 mm.

* * * * *